(12) United States Patent
Takahashi

(10) Patent No.: US 8,446,605 B2
(45) Date of Patent: May 21, 2013

(54) DIVISION OF RENDERING BLOCK IN IMAGE FORMING APPARATUS

(75) Inventor: Rina Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

(21) Appl. No.: 13/253,191

(22) Filed: Oct. 5, 2011

(65) Prior Publication Data

US 2012/0086970 A1    Apr. 12, 2012

(30) Foreign Application Priority Data

Oct. 8, 2010    (JP) .................................. 2010-228837

(51) Int. Cl.
G06F 15/00    (2006.01)
G06K 1/00    (2006.01)

(52) U.S. Cl.
USPC .............................. 358/1.13; 358/1.1; 358/1.9

(58) Field of Classification Search
None
See application file for complete search history.

(56) References Cited

FOREIGN PATENT DOCUMENTS

JP    2006-092125    4/2006

Primary Examiner — Thierry Pham
(74) Attorney, Agent, or Firm — IPUSA, PLLC

(57) ABSTRACT

An image forming apparatus for printing an image of print data includes a generating unit to analyze the print data to generate rendering command data, which includes rendering commands regarding rendering objects for each page, a storing unit to store the rendering command data, and a plurality of rendering processing units to read the rendering command data to execute the rendering commands associated with respective rendering blocks to perform rendering, wherein, upon completing rendering of a first rendering block, a first one of the rendering processing units sends a notice of completion to a second one of the rendering processing units that is performing rendering of a second rendering block, and wherein, in response to the notice, the second one of the rendering processing units divides the second rendering block, and requests the first one of the rendering processing units to perform rendering of part of the second rendering block.

10 Claims, 23 Drawing Sheets

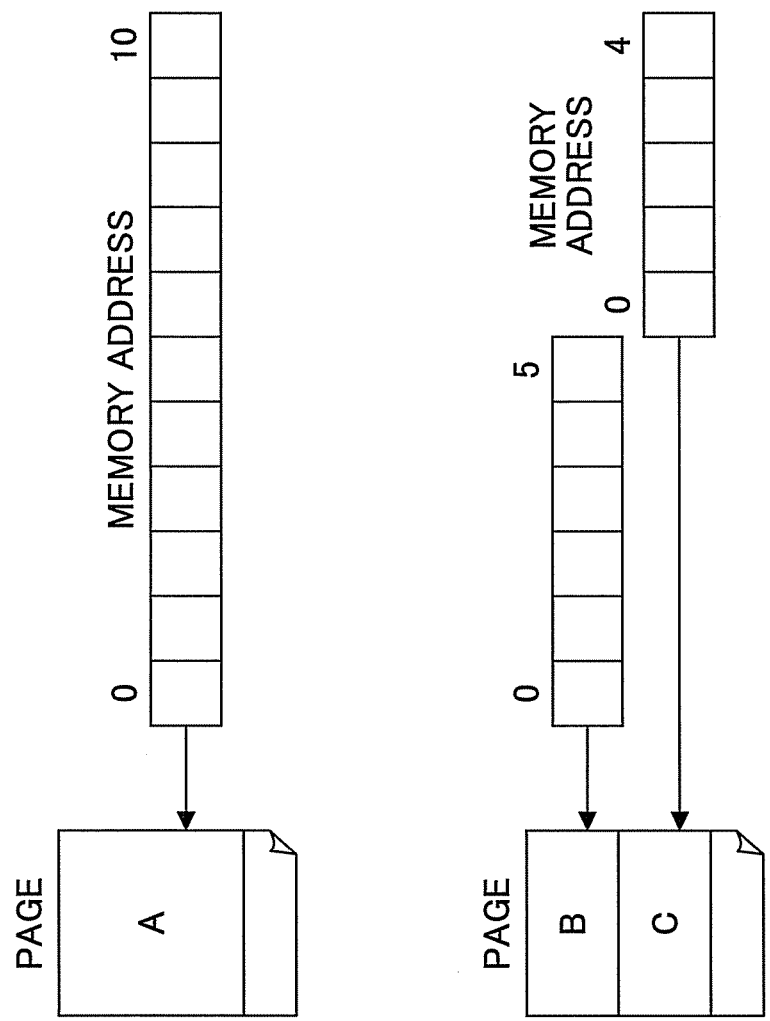

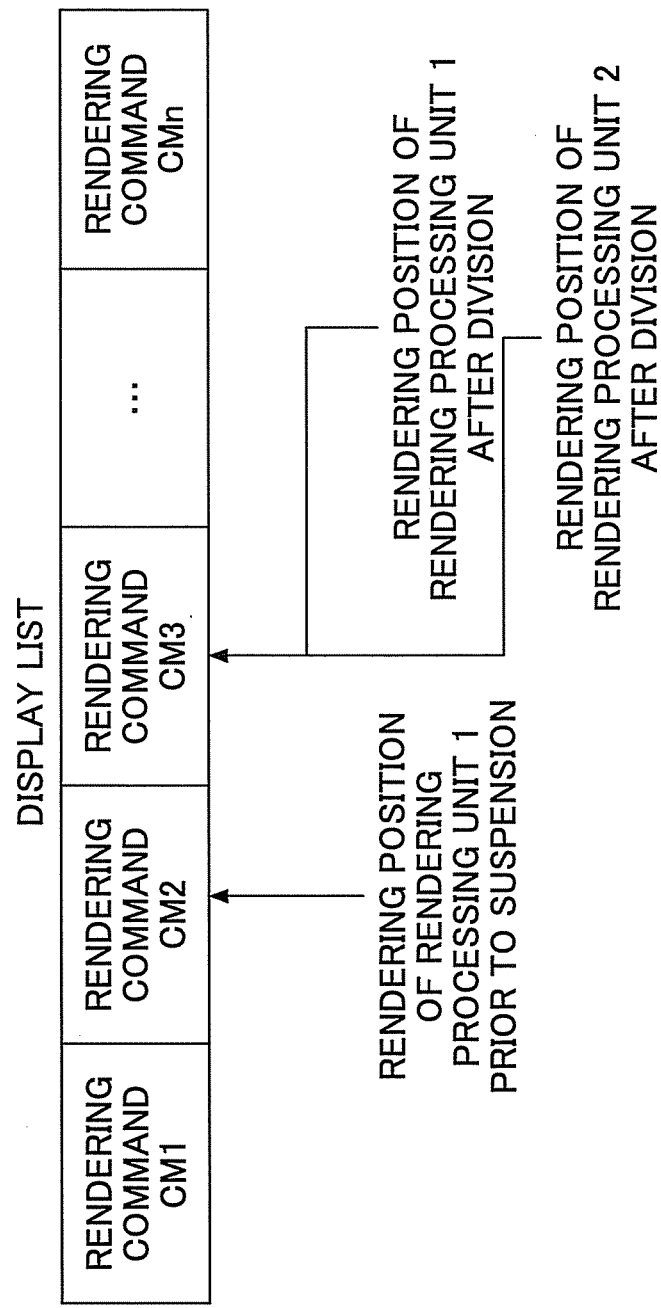

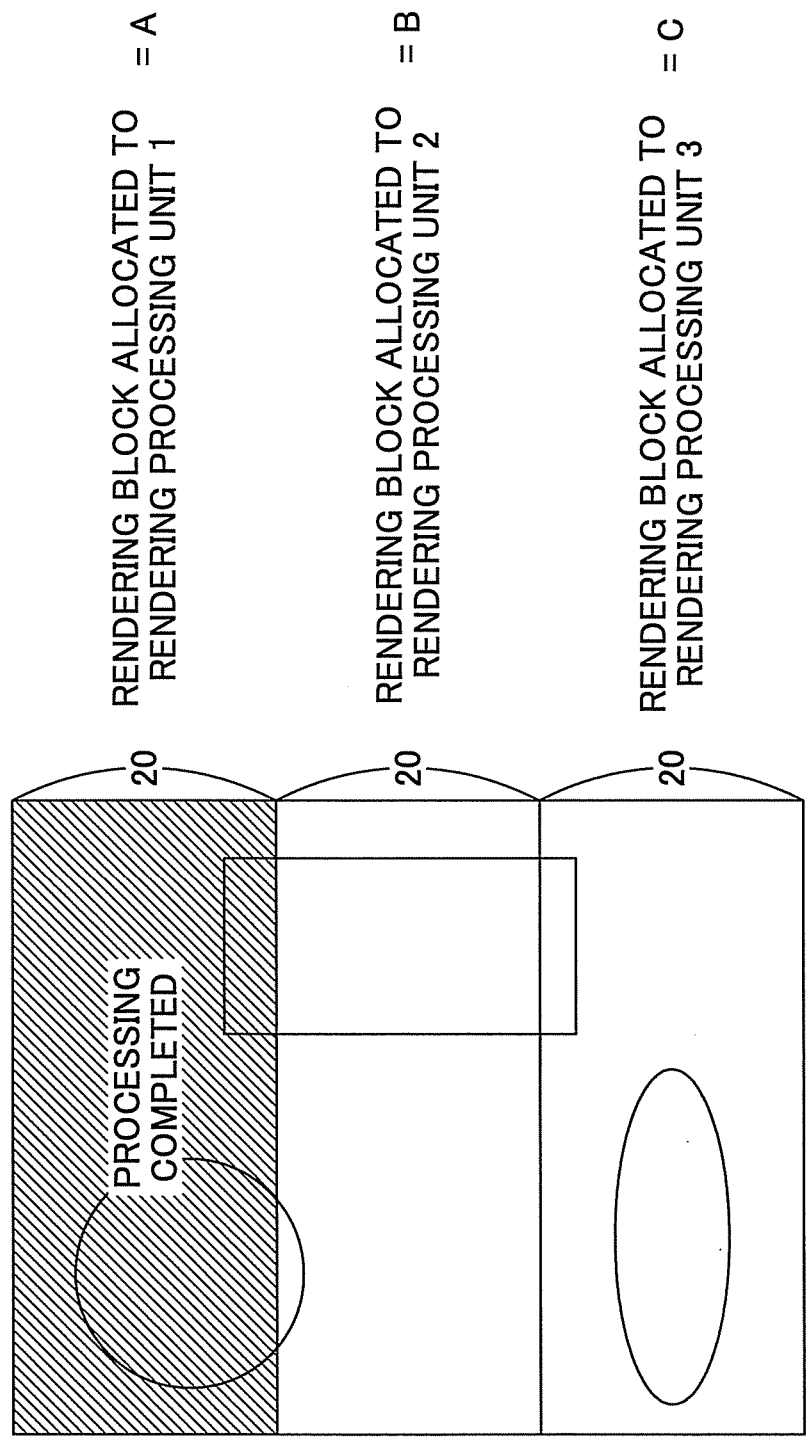

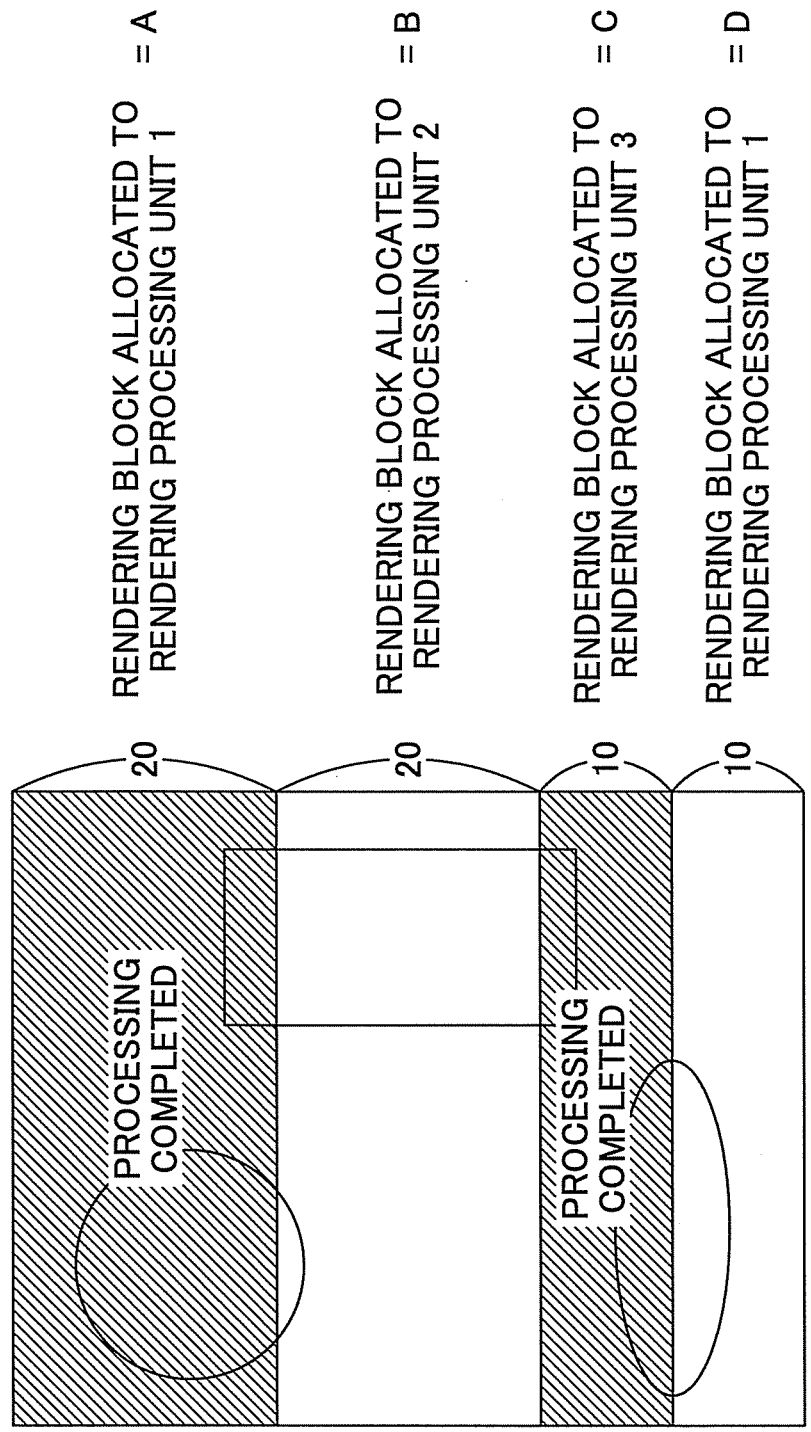

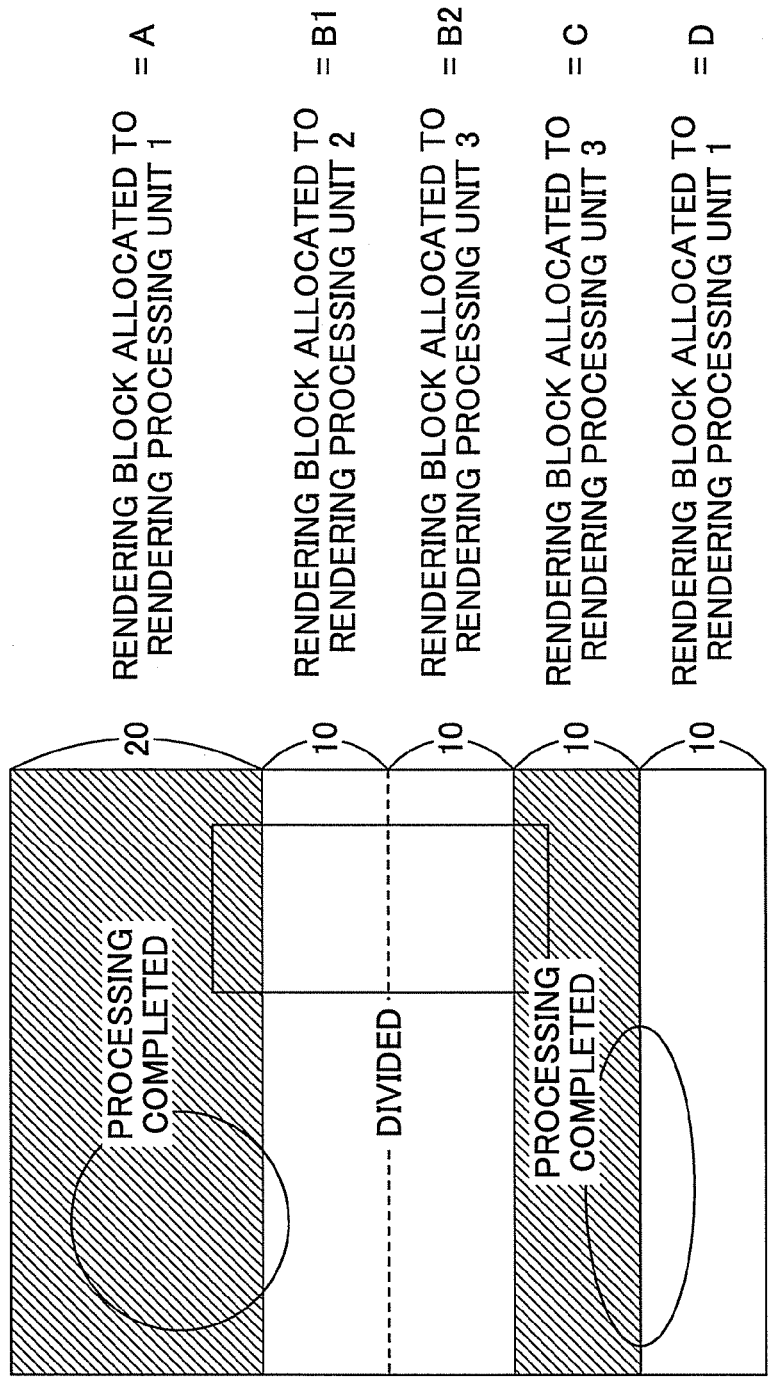

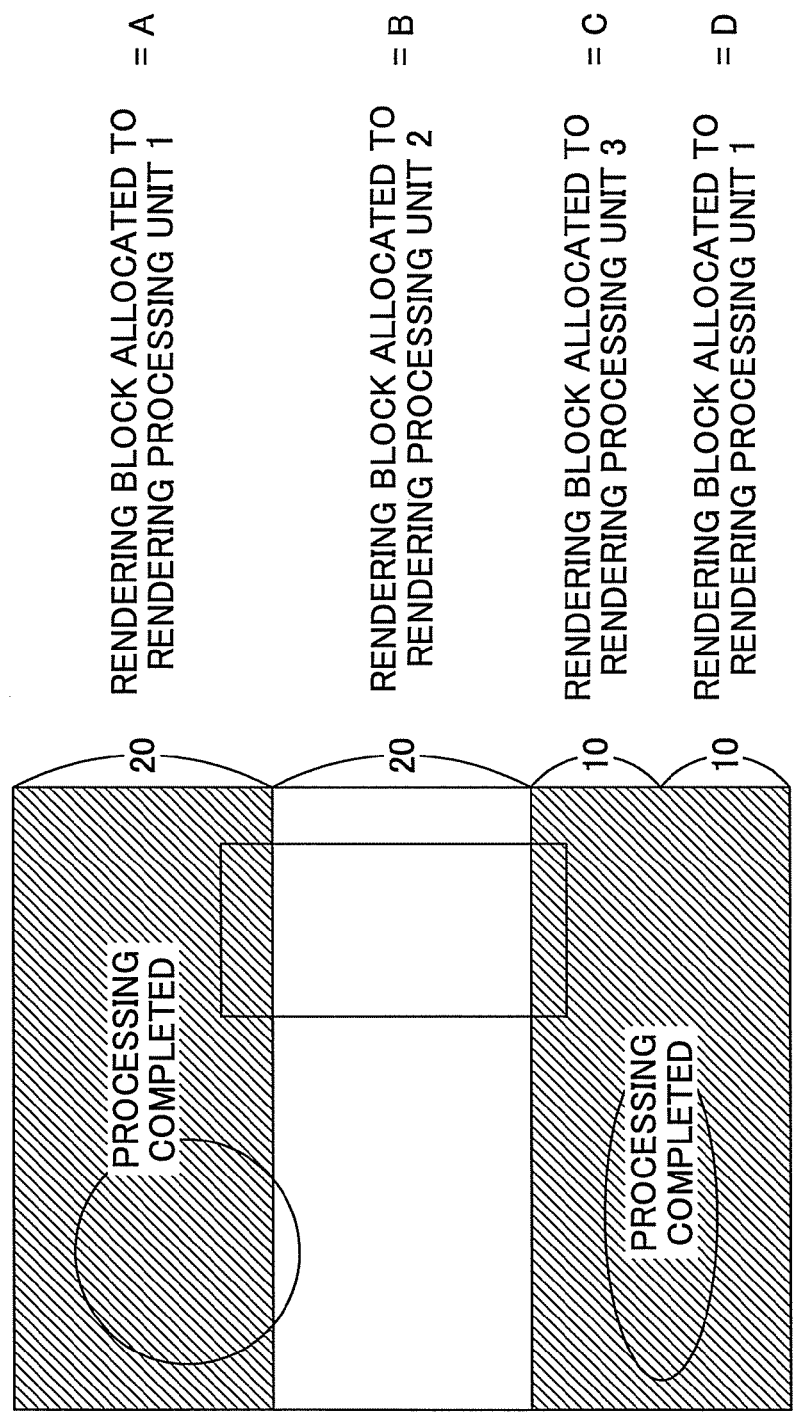

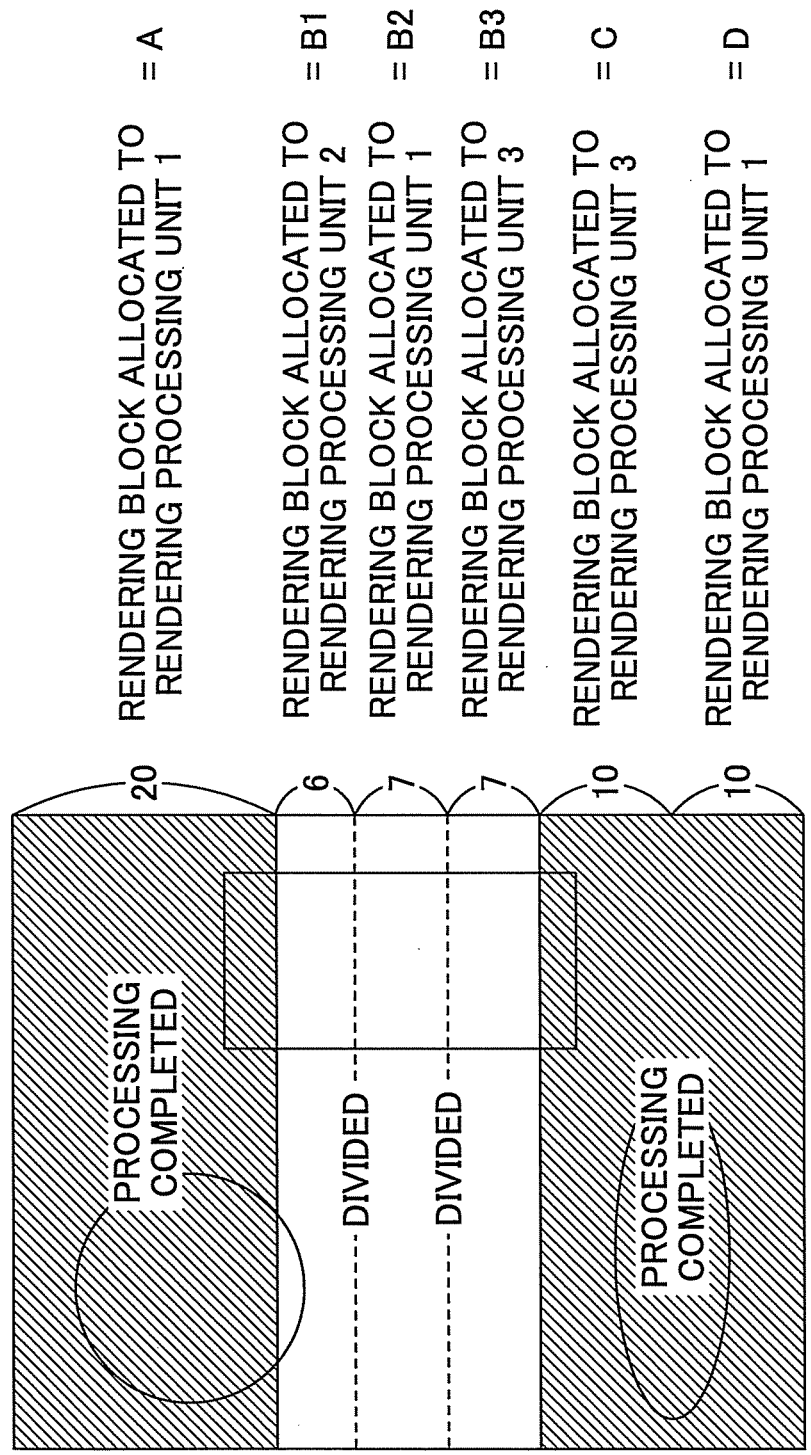

DIVISION OF RENDERING BLOCK IN IMAGE FORMING APPARATUS

BACKGROUND OF THE INVENTION

1. Field of the Invention

The disclosures herein generally relate to image forming apparatuses for rendering print data, and particularly relate to an image forming apparatus and an image processing method for which a rendering range can be modified.

2. Description of the Related Art

Conventional embedded devices often employ a single core CPU. Due to increasing use of multi-core CPUs such as dual-core CPUs or quad-core CPUs for general-purpose personal computers, there are also an increasing number of embedded devices which employ multi-core CPUs. Study has been underway to adopt a multi-core structure in a printer.

A printer adopting a multi-core structure can perform a plurality of processes in parallel, thereby increasing processing speed. Printers generally perform two processes, i.e., a DL generation process for generating intermediate date (i.e., display list) from PDL (page description language) data and a rendering process for rendering the intermediate data. A plurality of cores may perform rendering in parallel to increase the speed of printing process (see Japanese Patent Application Publication No. 2006-092125, for example).

The above-noted patent document discloses an image processing apparatus in which a plurality of image processing processors, although different from a multi-core structure, perform rendering within respective rendering blocks which together constitute one page.

In the image processing apparatus disclosed in the above-noted patent document, however, a block division unit monitors the operating status of each image processing processor. Upon finding an image processing processor in an idle state, the block division unit allocates a rendering block to this image processing processor. This arrangement gives rise to a problem in that the load statuses of processes need to be constantly monitored.

Accordingly, it may be desirable to provide an image forming apparatus, an information processing method, and a non-transitory recording medium having a program embodied therein that can dynamically allocate a rendering block to a rendering unit without monitoring the rendering unit.

SUMMARY OF THE INVENTION

It is a general object of at least one embodiment of the present invention to provide an image forming apparatus, an information processing method, and a non-transitory recording medium having a program embodied therein that substantially eliminate one or more problems caused by the limitations and disadvantages of the related art.

In one embodiment, an image forming apparatus for printing an image of print data on a transfer medium includes a rendering command generating unit to analyze the print data to generate rendering command data, which includes rendering commands regarding rendering objects for each page, a rendering command data storing unit to store the rendering command data, and a plurality of rendering processing units to read the rendering command data from the rendering command data storing unit and to execute the rendering commands associated with respective rendering blocks to perform rendering, wherein, upon completing rendering with respect to a first rendering block, a first one of the rendering processing units sends a notice of completion to a second one of the rendering processing units that is performing rendering with respect to a second rendering block, and wherein, in response to the notice, the second one of the rendering processing units divides the second rendering block, and requests the first one of the rendering processing units to perform rendering of part of the second rendering block.

In one embodiment, a method for processing an image in an image forming apparatus for printing an image of print data on a transfer medium includes analyzing, with a rendering command generating unit, the print data to generate rendering command data, which includes rendering commands regarding rendering objects for each page, storing, in a rendering command data storing unit, the rendering command data, reading, with a plurality of rendering processing units, the rendering command data from the rendering command data storing unit to execute the rendering commands associated with respective rendering blocks to perform rendering, sending, from a first one of the rendering processing units upon completing rendering of a first rendering block, a notice of completion to a second one of the rendering processing units that is performing rendering with respect to a second rendering block, and dividing, with the second one of the rendering processing units responding to the notice, the second rendering block to request the first one of the rendering processing units to perform rendering of part of the second rendering block.

In one embodiment, a non-transitory recording medium has a program embodied therein for causing an image forming apparatus for printing an image of print data on a transfer medium to perform a rendering command generating step of analyzing the print data to generate rendering command data, which includes rendering commands regarding rendering objects for each page, storing, in a rendering command data storing unit, the rendering command data, reading, with a plurality of rendering processing units, the rendering command data from the rendering command data storing unit to execute the rendering commands associated with respective rendering blocks to perform rendering, and a control step of performing control such that, upon completing rendering with respect to a first rendering block, a first one of the rendering processing units sends a notice of completion to a second one of the rendering processing units that is performing rendering with respect to a second rendering block, and such that, in response to the notice, the second one of the rendering processing units divides the second rendering block, and requests the first one of the rendering processing units to perform rendering of part of the second rendering block.

According to at least one embodiment, an image forming apparatus and an information processing method are provided that can dynamically allocate a rendering block to a rendering unit without monitoring the rendering unit.

BRIEF DESCRIPTION OF THE DRAWINGS

Other objects and further features of embodiments will be apparent from the following detailed description when read in conjunction with the accompanying drawings, in which:

FIGS. 10A and 10B are drawings illustrating the division of a rendering result memory;

FIG. 11 is a drawing schematically illustrating rendering commands executed after division of a rendering block;

FIGS. 15A and 15B are drawings illustrating an example of a rendering block when there are three rendering processing units;

FIGS. 17A and 17B is a drawing illustrating an example of division in the case of four rendering blocks when there are three rendering processing units; and FIGS. 18A and 18B are drawings illustrating an example of division in the case of plural rendering processing units completing rendering almost simultaneously.

DESCRIPTION OF THE PREFERRED EMBODIMENTS

In the following, embodiments of the present invention will be described with reference to the accompanying drawings.

Figure 1:
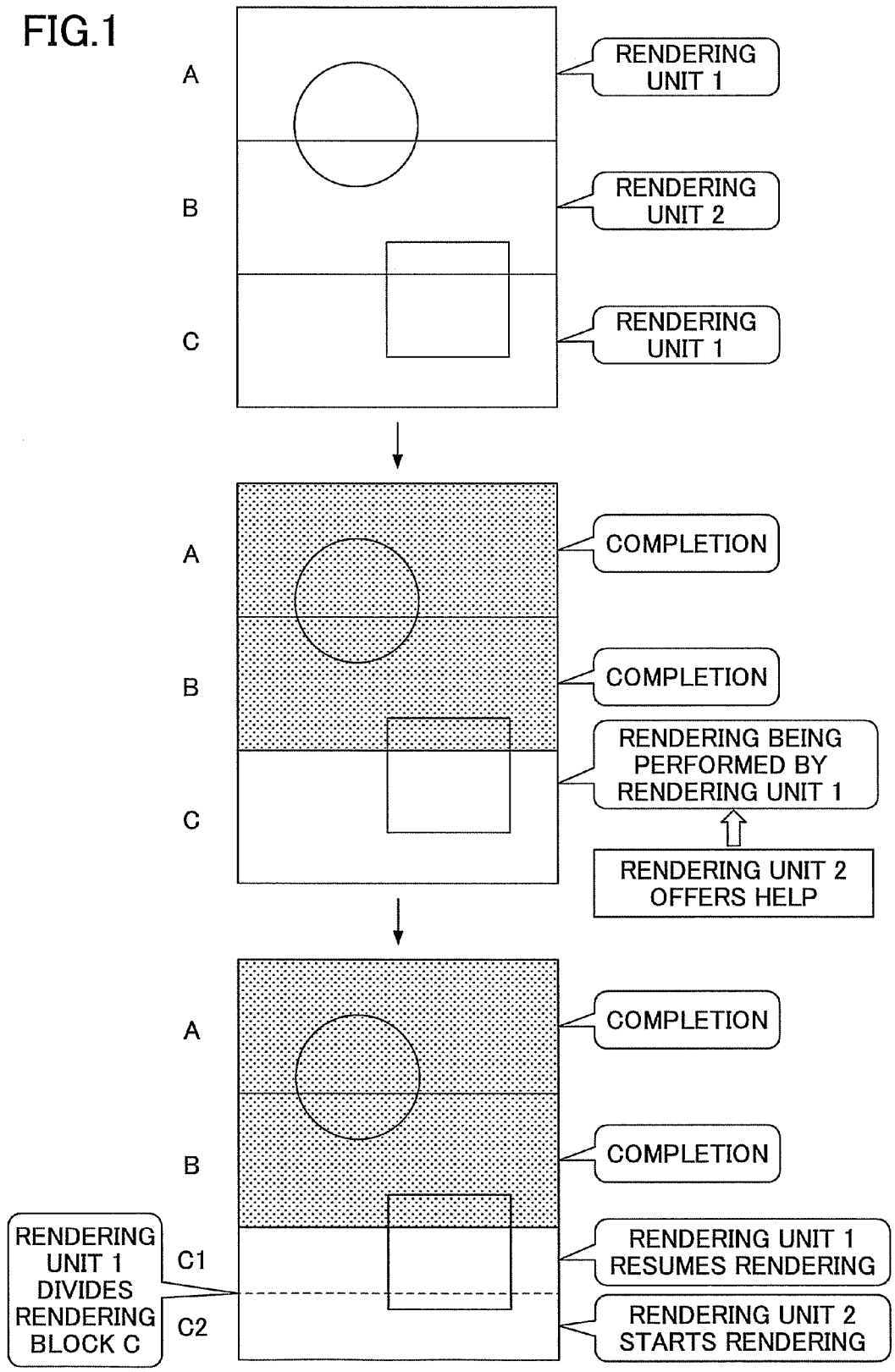
FIG. 1 is a drawing illustrating the allocation of rendering units in an image forming apparatus according to an embodiment.

FIG. 1 is a drawing illustrating the allocation of rendering units in an image forming apparatus according to an embodiment. The image forming apparatus includes a plurality of rendering units. One page is divided in advance into a plurality of rendering blocks such that the rendering units can simultaneously perform rendering in parallel. The rendering blocks are allocated to rendering units 1 and 2. For example, rendering blocks A and C may be allocated to the rendering unit 1, and a rendering block B may be allocated to the rendering unit 2. The rendering blocks A through C are arranged in this order from the upper end of the page to the lower end of the page.

The rendering unit 1 starts rendering in the rendering block C after completing rendering in the rendering block A. At around the same time, the rendering unit 2 completes rendering in the rendering block B. In the image forming apparatus of the present embodiment, the rendering unit 2 offers the rendering unit 1 help to perform rendering in the rendering block C.

The rendering unit 1 may use decision criteria for deciding whether division is necessary. Upon ascertaining that division is necessary, the rendering unit 1 divides the rendering block C into rendering blocks C1 and C2, followed by allocating the rendering block C2 to the rendering unit 2. The rendering unit 1 resumes rendering in the rendering block C1, and the rendering unit 2 starts rendering in the rendering block C2. Since the rendering block C is processed by the rendering units 1 and 2, the rendering time will be shortened.

As described above, the rendering unit 2 offers the rendering unit 1 help to perform rendering. With such an arrangement, the image forming apparatus of the present embodiment can dynamically allocate rendering blocks to rendering units without using a particular mechanism that monitors whether there is a rendering unit in an idle state.

<Configuration>

Figure 2:
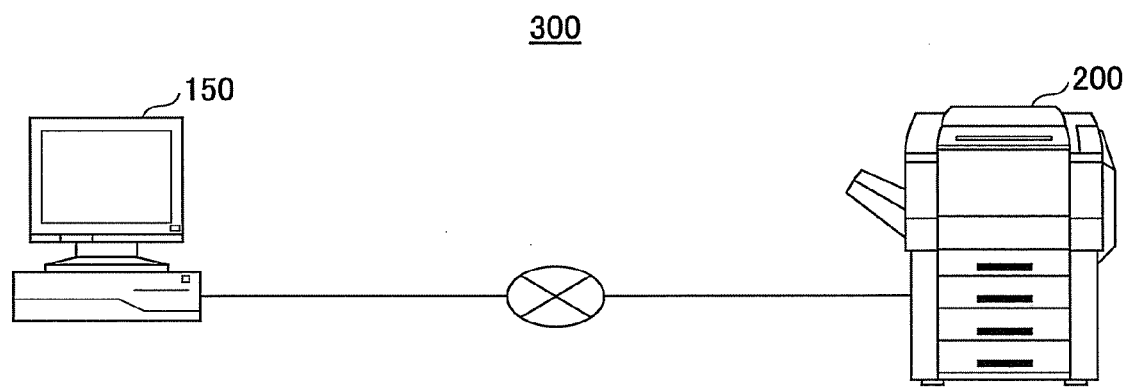
FIG. 2 is a drawing showing an example of a print system.

FIG. 2 is a drawing showing an example of a print system 300. In the print system 300, a host PC (Personal Computer) 150 and an image forming apparatus 200 are connected to each other via a network.

In response to a user operation, an application program running on the host PC 150 requests a graphic control unit (e.g., GDI) of the OS to print document data, for example. The graphic control unit uses an API (i.e., application program interface: basic function) independent of applications to generate rendering instructions (i.e., intermediate file) for rendering document data.

The graphic control unit thereafter calls up a printer driver for generating PDL data corresponding to the image forming apparatus 200. A DDI (i.e., device driver interface) between the graphic control unit and the printer driver is defined in advance. The printer driver converts the intermediate file into PDL data interpretable by the printer, and transmits the PDL data to the image forming apparatus 200.

Formats for PDL data include those defined by PostScript, PCL, RPCS, PDF (Portable Document Format), and XPS, for example. The format of PDL data needs to be interpretable by the image forming apparatus 200.

The image forming apparatus 200 analyzes the PDL data to generate a display list (which is sometimes referred to as intermediate data), followed by performing rendering and the like to print data. It may suffice for the image forming apparatus 200 to have a printer function. The image forming apparatus 200 may also be provided with a copier function, scanner function, a transmission (FAX, email, and folder) function, or the like.

Figure 3:
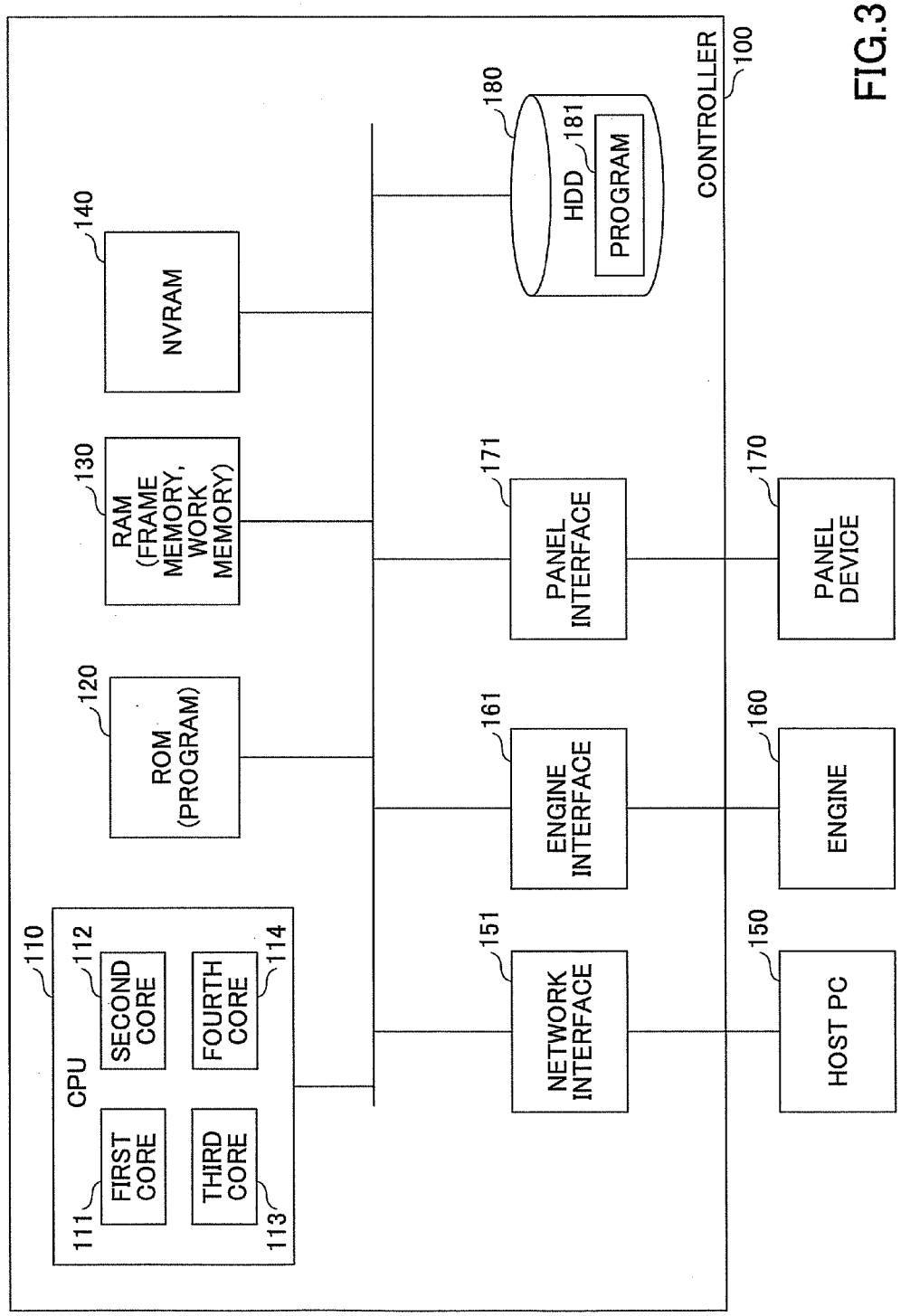
FIG. 3 is a drawing illustrating an example of the hardware configuration of an image forming apparatus.

FIG. 3 is a drawing illustrating an example of the hardware configuration of the image forming apparatus 200. The image forming apparatus 200 includes a controller 100 for controlling the entire image forming apparatus 200, an engine 160 for printing an image on a print sheet, and a panel device 170 for displaying various statuses and an operation panel for receiving user input.

The controller 100 includes a CPU 110, a ROM 120, a RAM 130, an NVRAM 140, a network interface 151, an engine interface 161, a panel interface 171, and an HDD 180.

The CPU 110 is a multi-core CPU including a first core 111, a second core 112, a third core 113, and a fourth core 114. The CPU 110 executes instructions included in a program 181. The program 181 may be divided into four parts, which are provided for the first core 111, the second core 112, the third core 113, and the fourth core 114, respectively. Alternatively, the four cores may execute a single program in an overlapping manner. The number of cores of the CPU 110 is two or more, and can be five or more. A plurality of CPUs independent of each other, which may be referred to as multi-processors or multi-CPUs, may be provided in place of the multi-core structure.

The ROM 120 stores a boot program, initial setting values, etc. The RAM 130 is used as a storage that stores a display list generated by the controller 100, and is also used as a work memory required by software to run. The NVRAM 140 is a nonvolatile memory that stores print conditions and the like that are set in the image forming apparatus 200. The network interface 151 exchanges data with the host PC 150, which is connected through the network. The engine interface 161 issues a print instruction and the like to control the engine 160.

The engine 160 includes at least a plotter engine that generates an image. The plotter engine includes photoconductive drums arranged in tandem. The plotter engine modulates laser beams based on image data obtained by rendering PDL data received from the host PC 150 to scan the photoconductive drums with the laser beams, thereby creating latent images. The latent images are developed by attaching toner. These toner images for one page are transferred to a print sheet by heat and pressure. The plotter engine may employ an inkjet system. The engine 160 may include a scanner engine and a FAX engine.

The panel interface 171 controls input/output with respect to the panel device 170. The HDD 180 stores data and the program 181.

Figure 4:
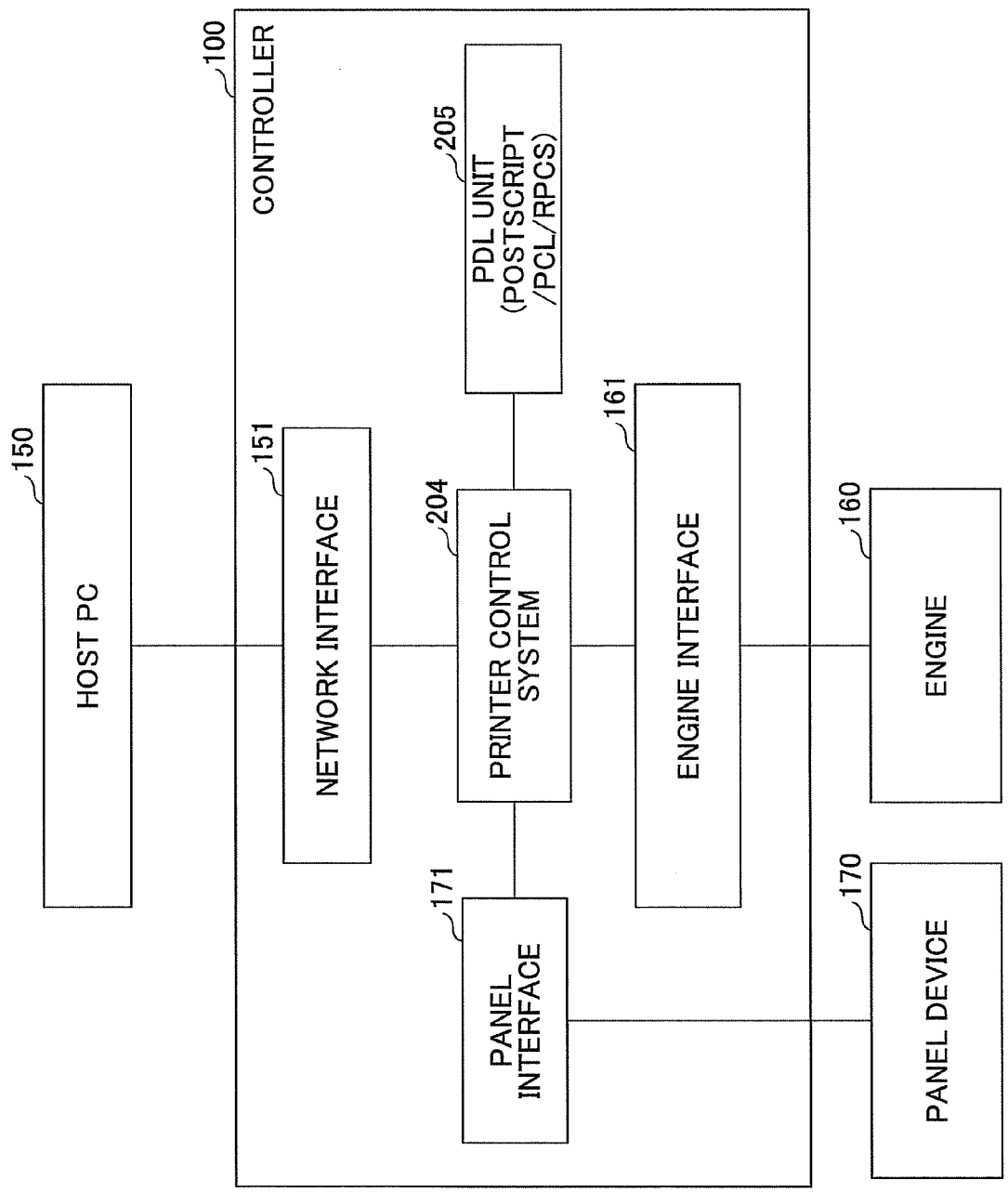
FIG. 4 is a drawing illustrating the schematic functional configuration of a controller.

FIG. 4 is a drawing illustrating the schematic functional configuration of the controller 100. In FIG. 4, the same elements as those of FIG. 3 are referred to by the same numerals, and a description thereof will be omitted. The functions of the controller 100 mainly include a printer control system 204 and a PDL unit 205, which are implemented by the CPU 110 executing the program 181.

The printer control system 204 requests the PDL unit 205 to perform rendering for the purpose of printing PDL data received through the network interface 151, thereby obtaining print image data as a result of the rendering from the PDL unit 205. After this, the printer control system 204 controls a print procedure, which includes, for example, requesting the engine interface 161 to print the print image data.

The PDL unit 205 generates rendered output image data based on the PDL data received from the printer control system 204. The PDL unit 205 may conform to various PDL-data formats such as PostScript, PCL, RPCS, PDF, XPS, etc.

Figure 5:
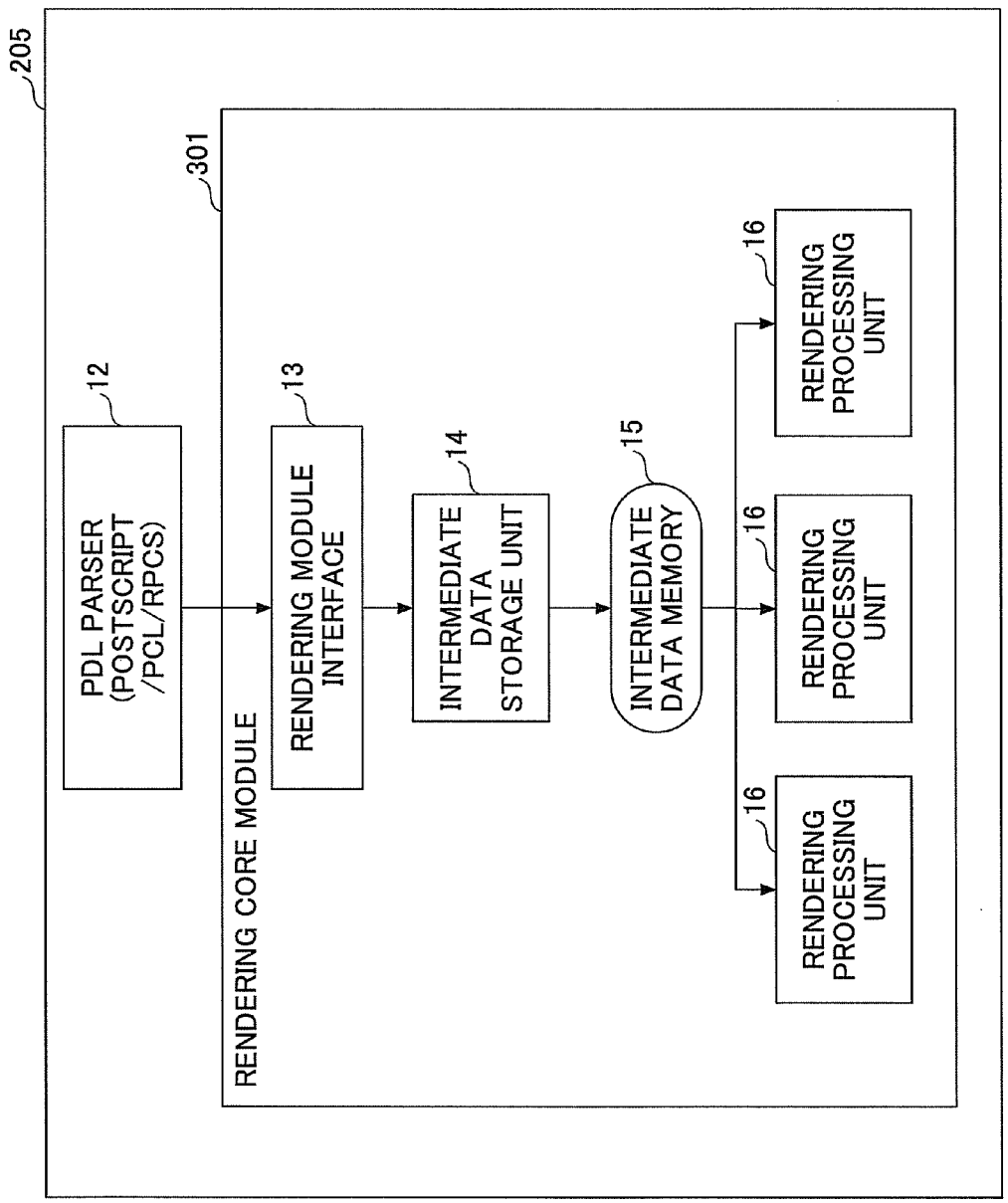
FIG. 5 is a drawing showing an example of the functional block configuration of a PDL unit.

FIG. 5 is a drawing showing an example of the functional block configuration of the PDL unit 205. The PDL unit 205 includes a PDL parser 12 and a rendering core module 301. The rendering core module 301 includes a rendering module interface 13, an intermediate data storage unit 14, an intermediate data memory 15, and rendering processing units 16.

The PDL parser 12 performs syntax analysis responsive to the type of PDL data to generate a display list (i.e., intermediate data). The rendering core module 301 performs rendering commands contained in the display list to perform rendering of the display list, thereby generating print image data.

The rendering module interface 13 is an interface for receiving texts, images, vector graphics, and rendering settings. The intermediate data storage unit 14 stores rendering data such as texts, images, and vector graphics and rendering setting information about colors, transparency settings, and the like in the intermediate data memory 15. The display list includes the rendering setting information and the rendering data such as texts, images, and vector graphics. The intermediate data memory 15 may be implemented by the RAM 130, the HDD 180, or the like.

The rendering processing units 16 perform rendering of output image data based on the display list on a rendering-block-by-rendering-block basis. The three rendering processing units 16 may have the same function, or may have different functions such as those having respective advantages in rendering processing (e.g., high-speed rendering). The number of rendering processing units 16 is three in this example, but may be any number that is more than one. It should be noted that rendering blocks are the areas into which one page is divided at constant intervals or predetermined varying intervals in the longitudinal direction of the page. Information about the rendering blocks are known to the rendering processing units 16.

The reason why the number of rendering processing units 16 in this example is three is because the number of cores of the CPU 110 is taken into consideration. In the present embodiment, one of the four cores is assigned to the PDL parser 12, and the remaining three cores are assigned to the rendering processing units 16, respectively. In the following, the rendering processing units 16 may be referred to as rendering processing units 1 through 3 when these units are discriminated from each other.

Figure 6:
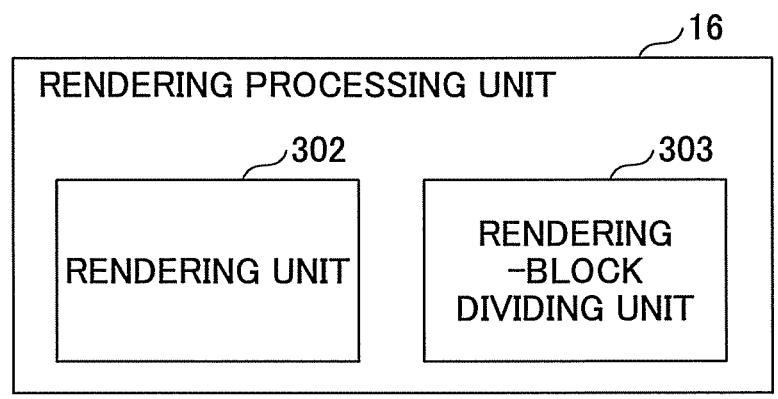
FIG. 6 is a drawing illustrating an example of the functional blocks of a rendering processing unit.

FIG. 6 is a drawing illustrating an example of the functional blocks of a rendering processing unit 16. Each rendering processing unit 16 includes a rendering unit 302 for performing rendering and checking whether there is a need to further divide a rendering block, and further includes a rendering-block dividing unit 303 for dividing a rendering block.

The rendering unit 302 performs rendering of output image data based on a display list. Further, the rendering unit 302 checks whether a rendering block needs to be divided. The check as to whether there is a need to divide a rendering block will be described later in detail. In short, this check is performed based on the area size of a rendering block, the number of remaining rendering commands that have yet to be processed, the processing time responsive to the predetermined capability of each rendering processing unit 16 (e.g., the degrees of capability and function), etc. The check criteria may differ depending on the rendering processing unit 16.

The rendering-block dividing unit 303 divides a rendering block when it is ascertained that division is necessary. Each rendering processing unit 16 has the rendering-block dividing unit 303, so that each rendering processing unit 16 can dynamically divide a rendering block.

<Procedure for Division>

Figure 7:
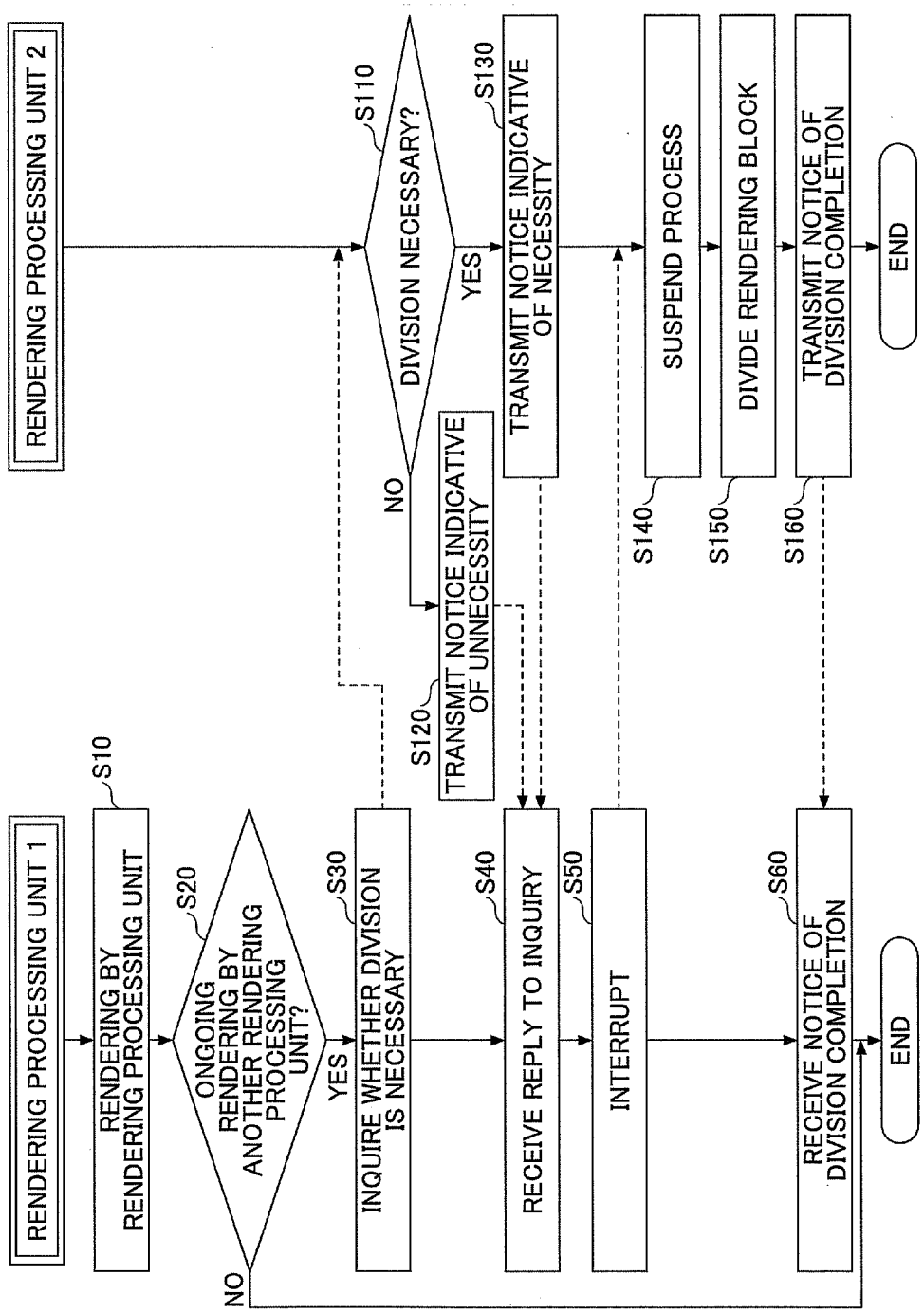
FIG. 7 is a flowchart illustrating the procedure performed by the rendering processing unit to divide a rendering block.

FIG. 7 is a flowchart illustrating the procedure performed by the rendering processing unit 16 to divide a rendering block. In FIG. 7, it is assumed that the rendering processing unit 1 has already completed rendering, and the rendering processing unit 2 is still performing rendering. The rendering processing unit 1 is to assist the rendering processing unit 2, so that the rendering processing unit 2 divides the rendering block. In the case where the rendering processing unit 2 has already completed rendering, and the rendering processing unit 1 is still performing rendering, the roles of the rendering processing units 1 and 2 are swapped over, but the procedure remains the same.

Upon being notified by the intermediate data storage unit 14 that a display list is stored in the intermediate data memory 15, the rendering processing unit 1 starts performing rendering with respect to a rendering block that is originally allocated in advance (S10).

Upon completing the rendering of the originally allocated rendering block, the rendering processing unit 1 checks whether the rendering processing unit 2 is performing rendering (S20). It does not matter how this check is performed. The check may be made by detecting that the load rate of the CPU core assigned to the rendering processing unit 2 exceeds a predetermined value, or by detecting that the rendering-block-specific flag indicative of completion of rendering is not yet set, etc.

When the rendering processing unit 2 is not performing rendering (No in S20), the rendering processing unit 1 determines that there is no further rendering block in the need of rendering, thereby finishing the procedure of FIG. 7. When there are three or more rendering processing units, the rendering processing unit 1 determines that another rendering processing unit 16 is performing rendering if the rendering processing unit 1 detects that there is at least one rendering processing unit 16 performing rendering.

When the rendering processing unit 2 is performing rendering (Yes in S20), the rendering processing unit 1 inquires of the rendering processing unit 2 whether division is necessary (S30). This inquiry may be performed by utilizing inter-core communication, for example. The design of the inter-core communication depends on the design of the CPU 110. Communication may be achieved through shared memory, by use of a dedicated line (ring) connecting the cores, by use of dedicated mesh lines connecting between the cores, etc.

Upon receiving an inquiry, the rendering unit 302 of the rendering processing unit 2 checks whether division is necessary (S110). The check as to whether division is necessary will be described later.

In the case of division being unnecessary (No in S110), the rendering unit 302 of the rendering processing unit 2 transmits a notice indicative of unnecessity to the rendering processing unit 1 (S120).

In the case of division being necessary (Yes in S110), the rendering unit 302 of the rendering processing unit 2 transmits a notice indicative of necessity to the rendering processing unit 1 (S130).

The rendering processing unit 1 receives the result of inquiry (S40). When receiving an inquiry result indicative of unnecessity of division, the rendering processing unit 1 does not need to perform further rendering, resulting in the procedure of FIG. 7 coming to an end.

Upon receiving an inquiry result indicative of necessity of division, the rendering processing unit 1 interrupts the rendering processing unit 2 (S50). Upon being interrupted, the rendering processing unit 2 starts dividing the rendering block.

Upon being interrupted, the rendering processing unit 2 first starts a suspension process (S140). The suspension process is performed as preparation to switch from rendering to division. The suspension process includes completing rendering commands being performed by the rendering unit 302 of the rendering processing unit 2 and storing the results of rendering obtained by the rendering commands. The rendering unit 302 calls up the rendering-block dividing unit 303 immediately upon completing the rendering commands being performed.

Upon being called, the rendering-block dividing unit 303 divides the rendering block (S150). The detail of division will be described later.

Upon completing the dividing of the rendering block, the rendering-block dividing unit 303 notifies the rendering processing unit 1 of the completion of division (S160). The notice indicative of completion of division may include information about a rendering block allocated to the rendering processing unit 1.

The rendering processing unit 1 receives the notice indicative of completion of division (S60). In response, the rendering unit 302 of the rendering processing unit 1 starts performing rendering with respect to the rendering block allocated through the division.

The rendering processing unit 2 may be interrupted by the rendering processing unit 3 during steps S140 through S160 (i.e., during the period from the interruption received by the rendering processing unit 2 to the transmission of the notice of division completion). In such a case, the rendering processing unit 2 detects two interruptions from the interruption controller, thereby dividing the rendering block into three blocks. This type of division corresponds to the simultaneous divisions of a single rendering block.

Figure 8:
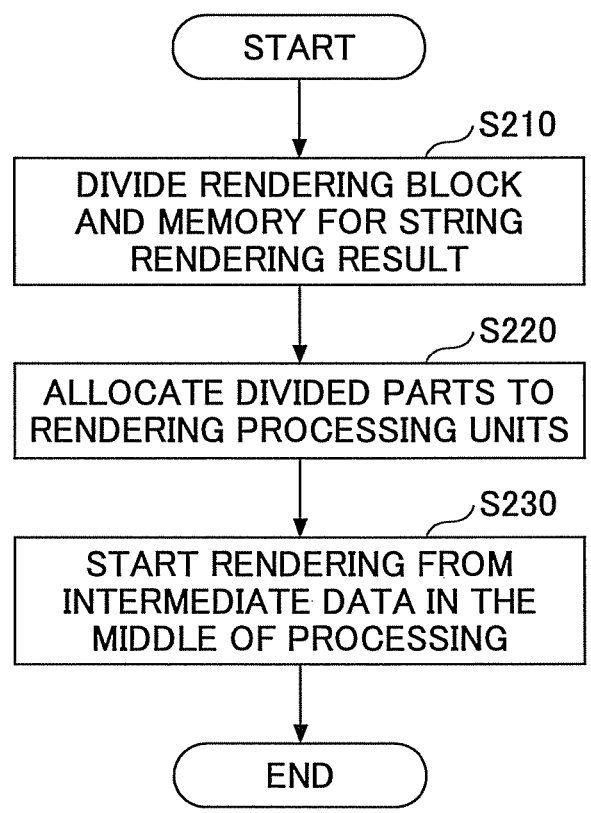
FIG. 8 is a flowchart illustrating the procedure performed by a rendering-block dividing unit to divide a rendering block.

FIG. 8 is a flowchart illustrating the procedure performed by the rendering-block dividing unit 303 to divide a rendering block. The procedure of FIG. 8 corresponds to the procedure performed by the rendering-block dividing unit 303 of the rendering processing unit 2 illustrated in FIG. 7. It may be noted that the rendering-block dividing unit 303 of the rendering processing unit 16 receiving interruption performs the same procedure.

The rendering-block dividing unit 303 divides the rendering block and the intermediate data memory 15 storing rendering results (S210). The dividing of the rendering block means dividing the rendering block into two. A rendering command in the display list contains information indicative of to which rendering block an output image of this rendering command belongs. The rendering unit 302 can thus selectively execute rendering commands belonging to the rendering block that is assigned thereto through block division.

Figure 9A:
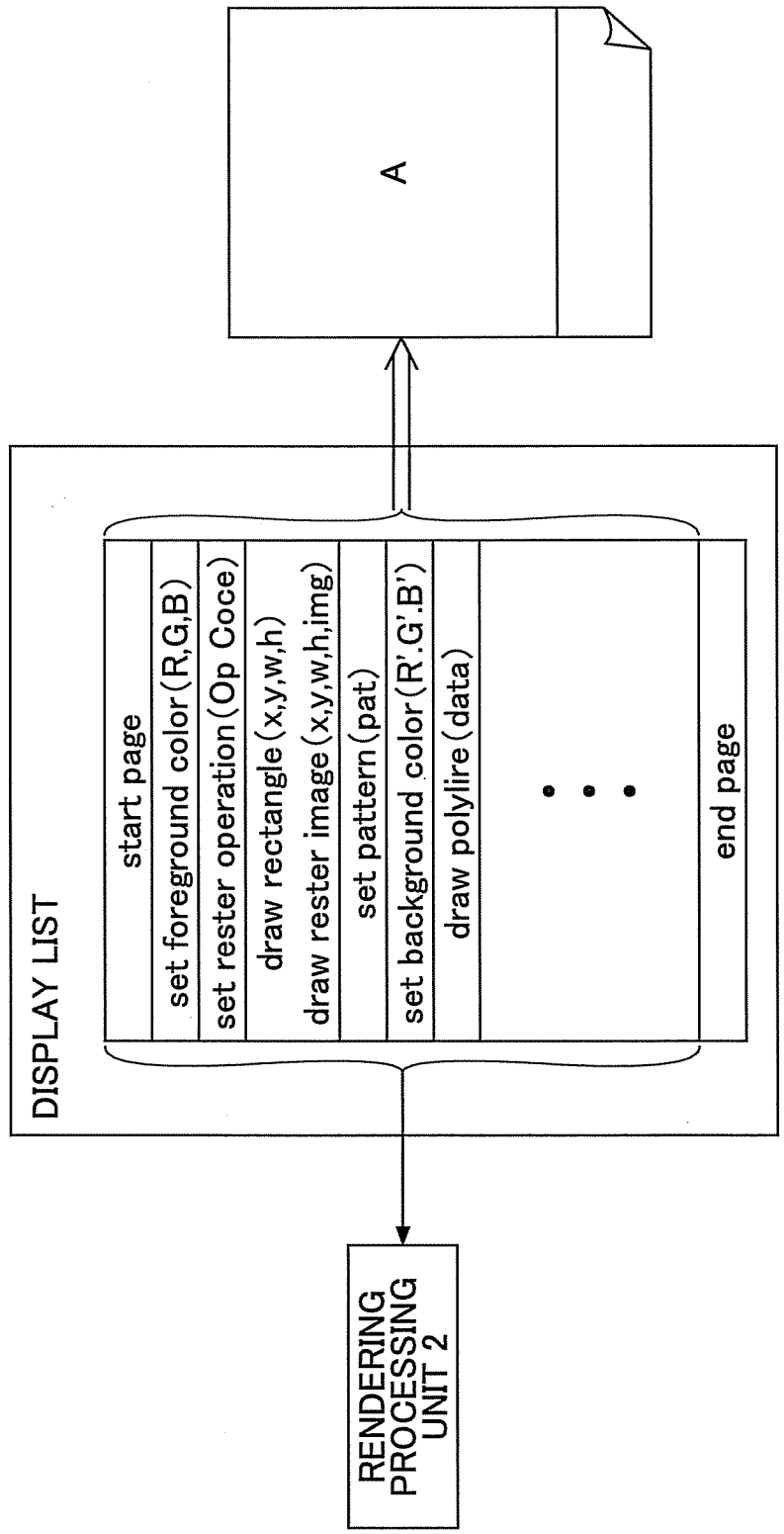
FIGS. 9A and 9B are drawings schematically illustrating the division of a rendering block.
Figure 9B:
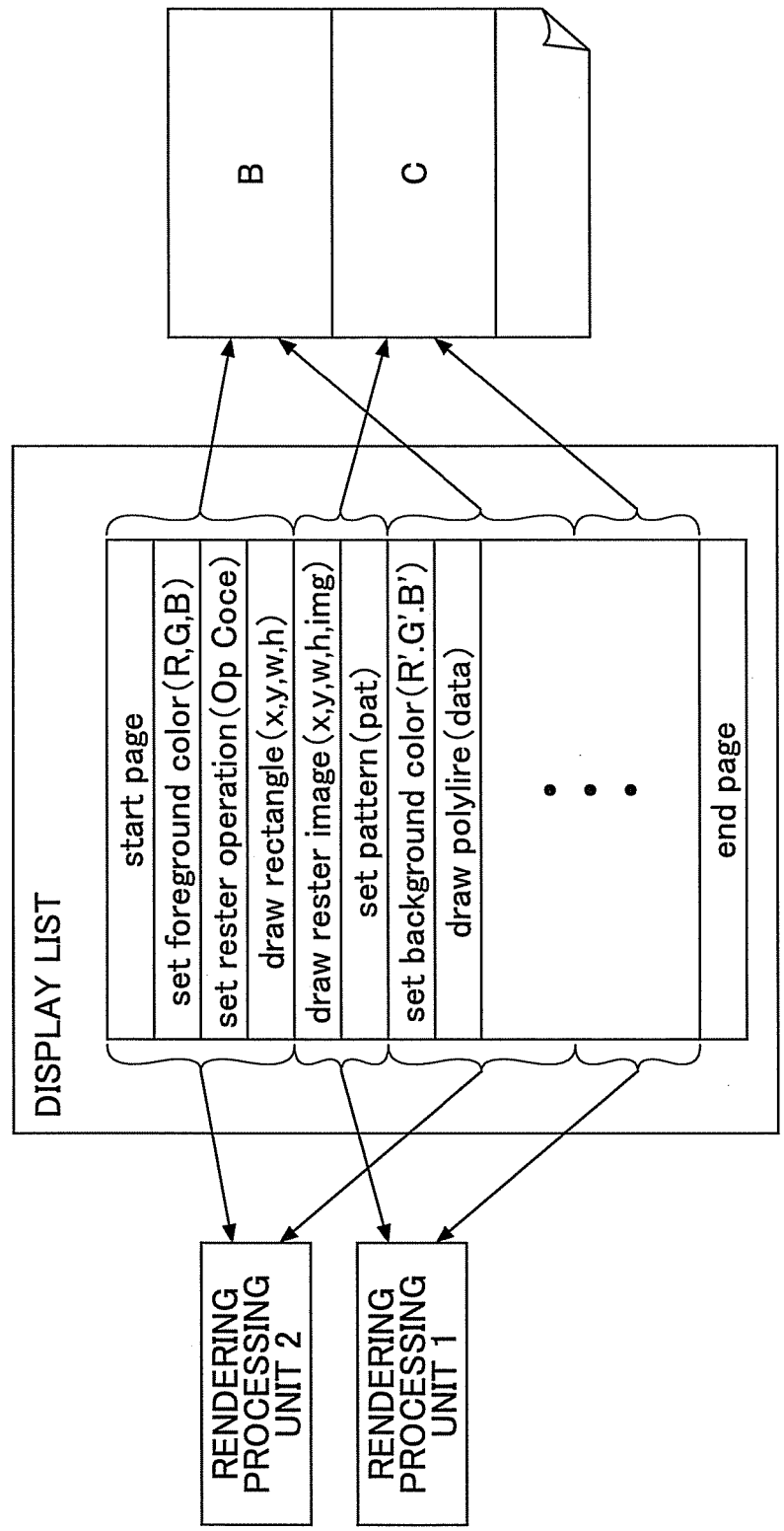

FIGS. 9A and 9B are drawings schematically illustrating the division of a rendering block. A display list is provided in a data format that is processable by the rendering processing units 16. A display list contains a list of various rendering commands and setting information of PDL data. For example, "set foreground color (R, G, B)" is a command for defining a foreground color, "set raster operation (Op Code)" a command for indicating an operation to be performed on an image, and "draw rectangle (x, y, w, h)" a command indicating positions and size of a rectangle to perform rendering of the rectangle.

Data such as x, y, and so on indicates the position of an object (e.g., a geometric figure drawn by the rendering command), and may be used to identify the rendering block to which a rendering command of interest in a display list belongs.

When the rendering-block dividing unit 303 divides a rendering block A into rendering blocks B and C, the rendering processing units 1 and 2 can identify rendering commands that belong to the rendering block B and rendering commands that belong to the rendering block C in the manner described above.

The rendering-block dividing unit 303 allocates the divided rendering blocks B and C to the rendering processing units 1 and 2, respectively. Upon obtaining information about the relevant rendering blocks, the rendering processing units 1 and 2 can select rendering commands that they should execute among the rendering commands of the display list.

In the following, the division of the intermediate data memory 15 will be described by referring to FIGS. 10A and 10B. FIG. 10A is a drawing illustrating an example of correspondence between the pre-division rendering block A and addresses in the intermediate data memory 15. In FIG. 10A, the result of rendering in the rendering block A is stored at addresses 0 through 10 in the intermediate data memory 15. The area size of a rendering block and a corresponding size in the intermediate data memory 15 are deterministic. In other words, the size required in the intermediate data memory 15 is determined upon knowing the rendering block. Namely, the correspondence between the rendering block and the addresses in the intermediate data memory 15 are known to the rendering-block dividing unit 303.

FIG. 10B is a drawing illustrating relationship between the division of a rendering block and the division of the intermediate data memory 15. The rendering block A is divided into rendering blocks B and C. The rendering-block dividing unit 303 determines a size required in the intermediate data memory 15 based on the size of the rendering block B, thereby dividing addresses 0 through 10 in the intermediate data memory 15. In FIG. 10B, the size required for the rendering block B in the intermediate data memory 15 is 6, so that the rendering-block dividing unit 303 allocates addresses 0 through 5 in the intermediate data memory 15 to the rendering block B. Further, the rendering-block dividing unit 303 allocates addresses 6 through 10 in the intermediate data memory 15 to the rendering block C. The rendering-block dividing unit 303 notifies the rendering processing units 1 and 2 of allocated addresses in the intermediate data memory 15.

Referring to FIG. 8 again, the rendering-block dividing unit 303 allocates rendering blocks to the rendering processing units 1 and 2 as illustrated in FIG. 9B, for example, and allocates addresses in the intermediate data memory 15 as illustrated in FIG. 10B (S220). The allocation of rendering blocks may be notified of by specifying a start point and an end point in the longitudinal direction of one page (hereinafter referred to as band positions). In the examples illustrated in FIG. 9B and FIG. 10B, the rendering-block dividing unit 303 notifies the rendering processing unit 2 of the band positions of the rendering block B, and notifies the rendering processing unit 1 of the band positions of the rendering block C.

The rendering units 302 of the rendering processing units 1 and 2 resume executing rendering commands of the display list with respect to the allocated rendering blocks C and B, respectively (S230).

FIG. 11 is a drawing schematically illustrating rendering commands executed after division of a rendering block. While the rendering processing unit 2 is executing a rendering command CM2, the rendering processing unit 1 may interrupt the rendering processing unit 2. In such a case, the rendering unit 302 of the rendering processing unit 2 continues to execute the rendering command CM2 as part of the suspension process. The rendering commands for which execution is resumed are thus a rendering command CM3 and onwards.

When the rendering processing units 1 and 2 resume executing rendering commands, thus, the rendering processing units 1 and 2 starts execution from the rendering command CM3. When executing the rendering command CM3 and onwards, the rendering processing unit 2 checks whether each rendering command of interest belongs to the allocated rendering block B, and executes only the rendering commands belonging to the rendering block B. When executing the rendering command CM3 and onwards, the rendering processing unit 1 checks whether each rendering command of interest belongs to the allocated rendering block C, and executes only the rendering commands belonging to the rendering block C. In this manner, a rendering block is actually divided.

<Check of Need for Division>

A description will be given of the procedure of determining whether division is necessary. The rendering processing units 1 through 3 may have capabilities as follows.

Figure 12:
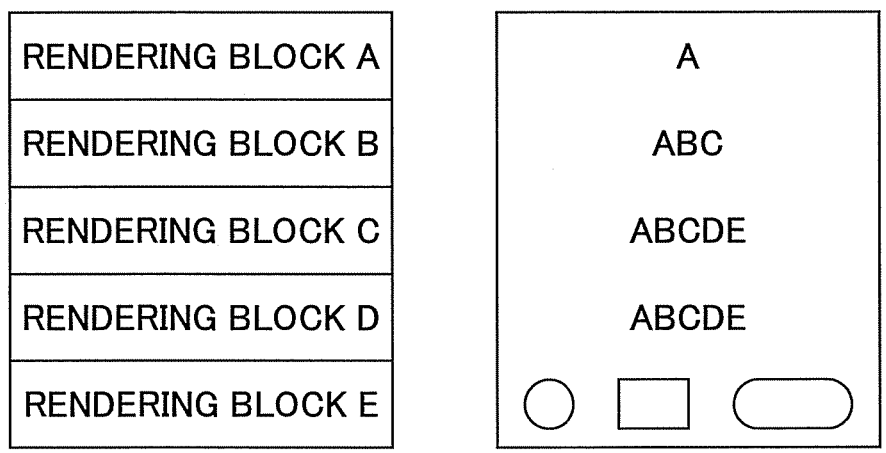
FIG. 12 is a drawing illustrating an example of relationships between a rendering block and objects.

Rendering Processing Unit 1: Suitable for Rendering of Graphics
Rendering Processing Unit 2: Unsuitable for Rendering of Graphics
Rendering Processing Unit 3: No Particular Characteristics It is assumed that the rendering processing units 1 through 3 are characterized as described above, and that rendering blocks include respective objects as illustrated in FIG. 12. As illustrated in FIG. 12, the rendering blocks A through E include letters, and the rendering block E include graphics.

The rendering processing units 1 through 3 may be assigned to the rendering blocks A through C, respectively. The rendering processing unit 1 starts performing rendering of the rendering block D upon completing rendering of the rendering block A. Thereafter, the rendering processing unit 2 starts performing rendering of the rendering block E upon completing rendering of the rendering block B. There are a lot of graphic objects in the rendering block E, and the rendering processing unit 2 is not suitable for rendering of such objects. A lengthy time would thus be required. Since the rendering block E includes a lot of graphic objects, processing by the rendering unit 302 will be efficient if the rendering processing unit 1 performs rendering of these objects. Such a factor is taken into account when the rendering unit 302 determines whether division is necessary.

Figure 13:
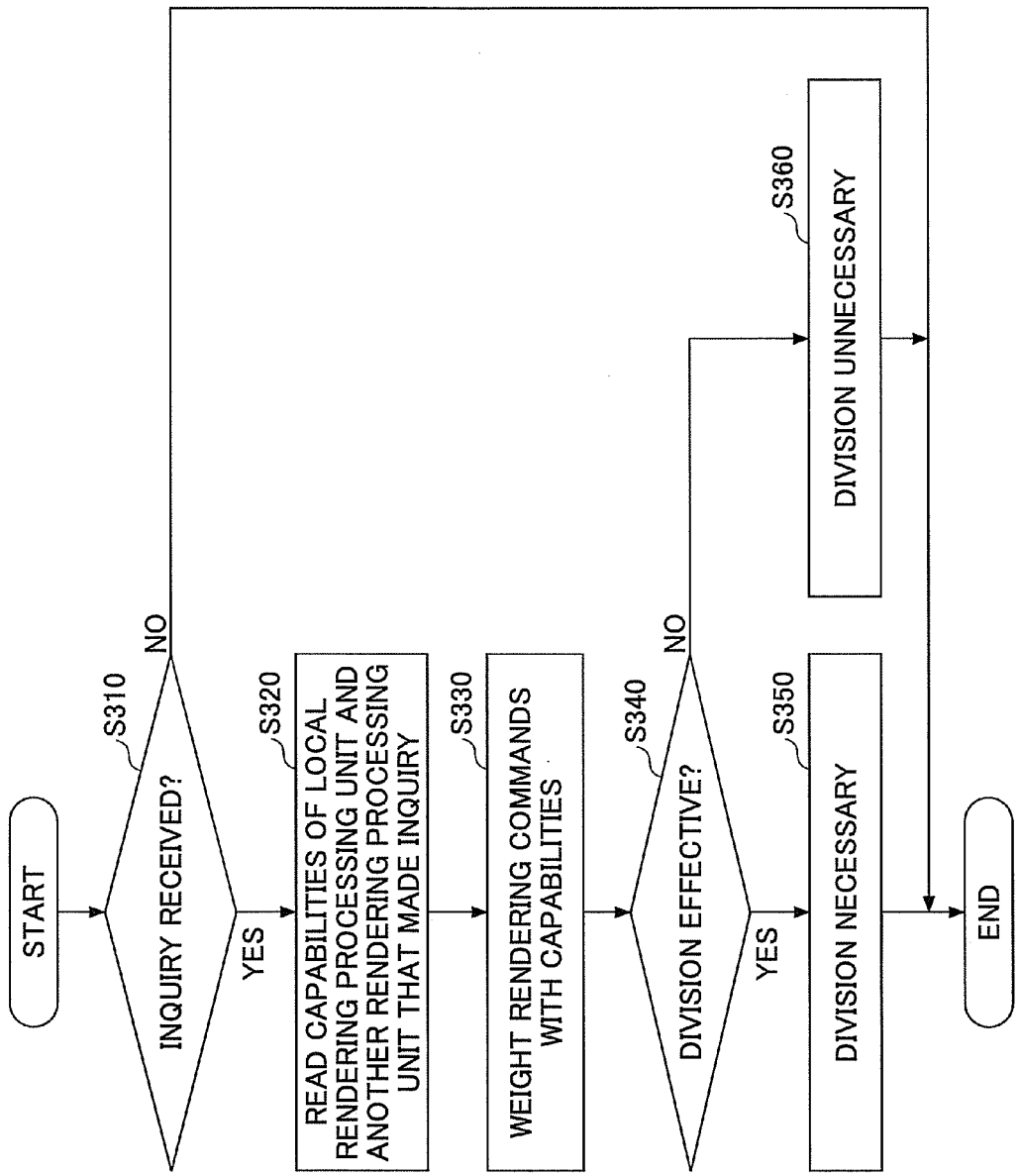
FIG. 13 is a flowchart illustrating the procedure performed by the rendering unit to determine whether division is necessary.

FIG. 13 is a flowchart illustrating the procedure performed by the rendering unit 302 to determine whether division is necessary. The rendering unit 302 first checks whether there is an inquiry from another rendering processing unit (e.g., rendering processing unit 1) (S310). When there is no inquiry, the procedure of FIG. 13 comes to an end.

When there is an inquiry (Yes in S310), the rendering unit 302 reads its own capability and the capability of the rendering unit 302 of the rendering processing unit 1 that has made the inquiry (S320). The capabilities are specified by numeric values that indicate the capabilities of the rendering processing units 1 through 3 (or the rendering units thereof) on an object-specific basis.

<<Rendering Processing Unit 1>>
Letter: 2
Image: 2
Graphics: 3
(1: unsuitable, 2: average, 3: suitable)

The capabilities of the rendering units 302 are reported to the rendering processing units 16 from the printer control system 204 at any timing prior to the generation of a display list.

The rendering unit 302 estimates a processing time TA by weighting, with its own capability, unprocessed rendering commands belonging to the rendering block that is being processed, and also estimates a processing time TB by weighting, with the capability of the rendering processing unit 1 that has made the inquiry, the unprocessed rendering commands belonging to the rendering block that is being processed. For example, the processing time TB of the rendering processing unit 1 may be estimated by counting the rendering commands directed to letters and images as having time counts required to process letters at average processing speed and also by counting the rendering commands directed to graphics as having time counts required to process graphics at high processing speed. The processing time A can also be estimated by applying the same or similar calculation to the rendering processing unit 2.

If the processing time TB is equal to or shorter than the processing time TA, the division of the rendering block is expected to reduce the processing time by more than 50%. If the processing time TB is twice as long as the processing time TA, for example, the division of the rendering block into equal halves has little effect in reducing the processing time. Accordingly, division may not be effective if TB≧2TA.

The rendering unit 302 determines whether division is necessary in the manner as described above (S340). If division is effective (Yes in S340), the rendering unit 302 determines that division is necessary (S350). If division is not effective (No in S340), the rendering unit 302 determines that division is not necessary (S360).

The rendering unit 302 sends a notice indicative of the result of determination to the rendering processing unit 1 via inter-core communication. With this arrangement, the rendering processing unit 1 having completed rendering can determine whether to perform interruption.

When the rendering processing unit 2 receives an inquiry, the number of unprocessed rendering commands belonging to the rendering block that is being processed by the rendering processing unit 2 may be sufficiently small. In such a case, there is little need for division. Determination not to perform division is thus made regardless of processing time in such an event.

When the rendering processing unit 2 receives an inquiry, the number of unprocessed rendering commands belonging to the rendering block that is being processed by the rendering processing unit 2 may be larger than a predetermined number. Even in such a case, there is little need for division if the area size of the rendering block is sufficiently small. Determination not to perform division is thus made regardless of processing time in such an event.

In consideration of the above, the conditions under which the determination to perform division is preferable satisfy all of the following conditions. It should be noted that some part of the conditions may only be used.

1) The number of unprocessed rendering commands belonging in the rendering block that is being processed by the rendering processing unit 2 receiving an inquiry is more than a predetermined number.
2) The area size of the rendering block that is being processed by the rendering processing unit 2 receiving an inquiry is more than a predetermined threshold.
3) Processing Time TB≧2×Processing Time TA <Example of Division>

Figure 14A:
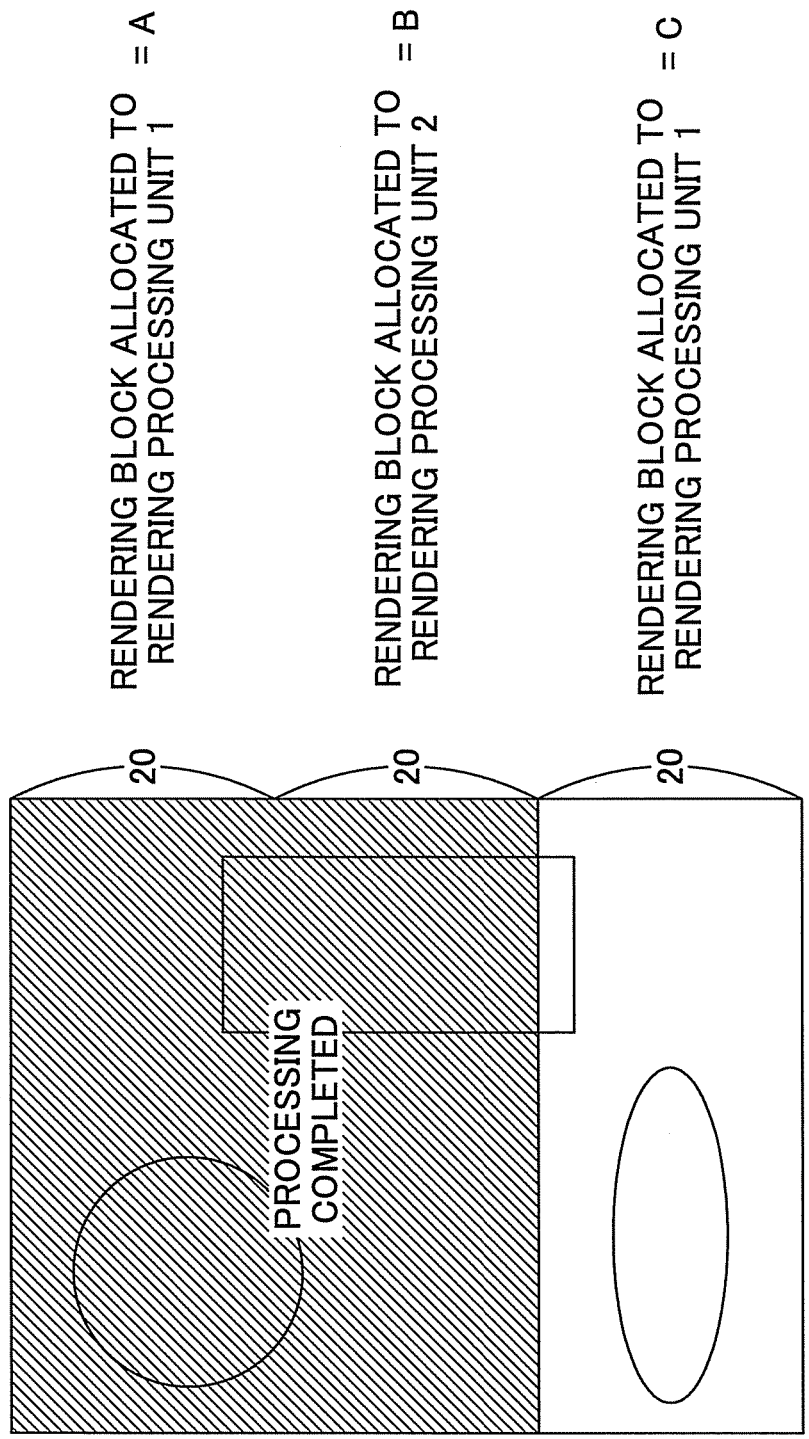
FIGS. 14A and 14B are drawings illustrating an example of a rendering block when there are two rendering processing units.

FIG. 14A is a drawing illustrating an example of a rendering block when there are two rendering processing units 16. The rendering block A is allocated to the rendering processing unit 1, the rendering block B allocated to the rendering processing unit 2, and the rendering block C allocated to the rendering processing unit 1. In this case, either the rendering of the rendering block A by the rendering processing unit 1 or the rendering of the rendering block B by the rendering processing unit 2 comes to an end ahead of the other.

When the rendering of the rendering block A by the rendering processing unit 1 comes to an end first, the rendering processing unit 1 starts performing rendering of the rendering block C. In this case, the rendering processing unit 2 inquires of the rendering processing unit 1 whether division is necessary.

When the rendering of the rendering block B by the rendering processing unit 2 comes to an end first, the rendering processing unit 2 inquires of the rendering processing unit 1 whether division is necessary. In this case, the rendering processing unit 1 has part of the rendering block A and all of the rendering block C left to be processed. If the number of remaining rendering commands in the rendering block A is small, the rendering processing unit 1 may determine that no division is necessary for the rendering block A. However, the rendering processing unit 1 may determine that division is necessary for the rendering block C.

In the absence of special circumstances such as the processing speed of the rendering processing unit 1 being far faster than that of the rendering processing unit 2, the rendering-block dividing unit 303 of the rendering processing unit 1 will divide the rendering block after the rendering unit 302 of the rendering processing unit 1 checks whether division is necessary.

Figure 14B:
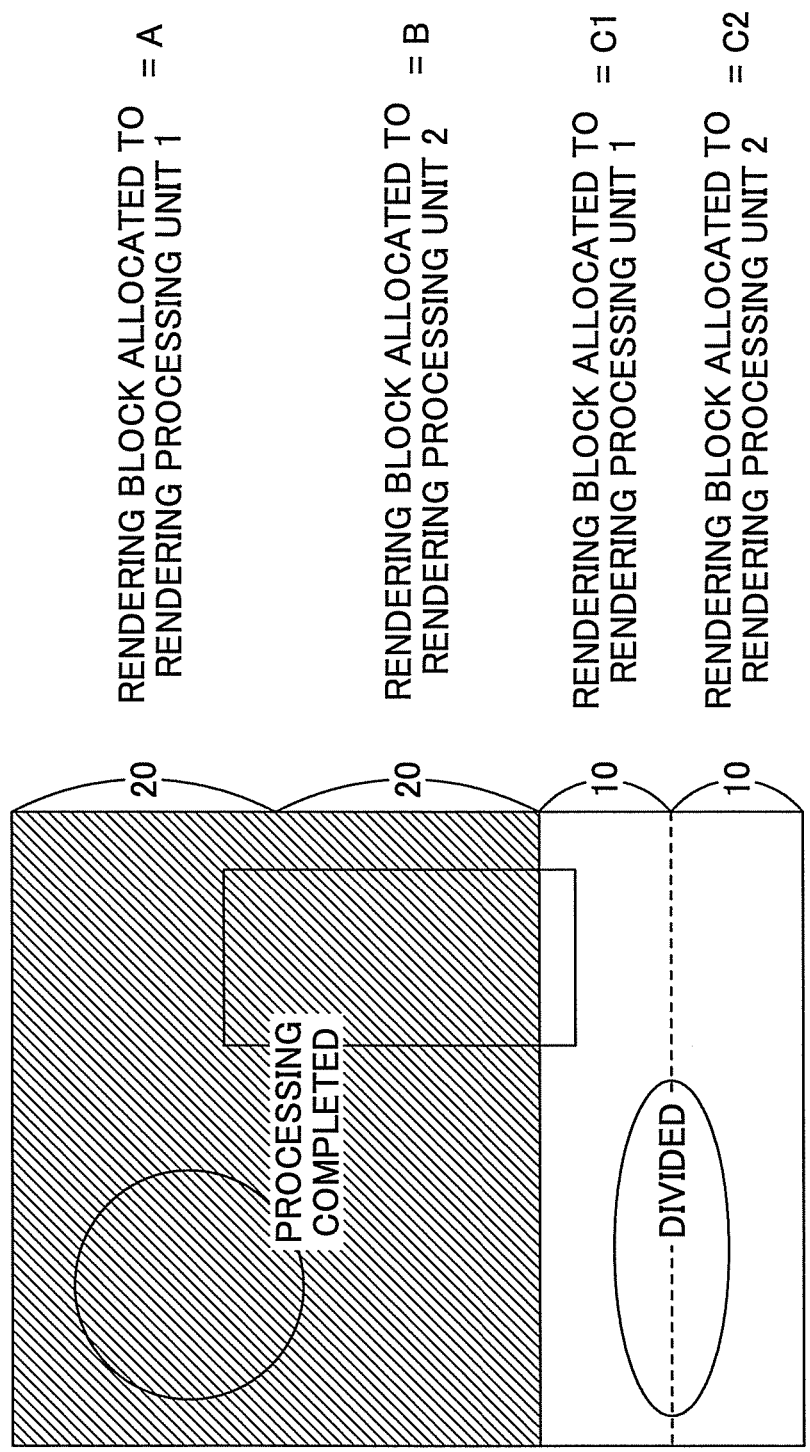

FIG. 14B is a drawing schematically illustrating an example of dividing the rendering block C into equal halves. The rendering unit 302 of the rendering processing unit 1 determines that division is necessary. In response, the rendering-block dividing unit 303 divides the rendering block C into rendering blocks C1 and C2 having the same size.

Such division makes it possible to distribute processing loads regardless of the number of rendering blocks (three in this example) or the number of rendering processing units (two in this example). Further, there is no need for a mechanism for monitoring the rendering processing units 16.

<Determination of Size of Rendering Blocks upon Division>

In the following, a description will be given of the sizes of divided rendering blocks. In place of division at equal intervals, division may be made at varying intervals depending on the capabilities of the rendering processing units 16, for example. Specifically, the rendering block may be divided in proportion to the capabilities of the rendering processing units 16, or may be divided such that the divided rendering blocks predominantly contain rendering commands that can be processed at high speed.

For example, "an average number of commands executed per clock cycle×frequency" may be known. In such a case, the rendering-block dividing unit 303 may divide the rendering block in proportion to such indicated capabilities (e.g., clock frequencies).

As was described in connection with the division check, the sizes of divided rendering blocks may be determined based on the processing time lengths estimated for respective capabilities. For example, the processing time TB of the rendering processing unit 1 taking into account the capability thereof may be twice as long as the processing time TA of the rendering processing unit 2 taking into account the capability thereof. In such a case, the processing time length of the rendering unit 302 receiving an inquiry and the processing time length of the rendering unit 302 making the inquiry become almost equal to each other if the rendering block is divided by a ratio of 2 to 1. In this manner, the rendering processing time can be reduced with respect to the rendering blocks as a whole. Specifically, the processing time is reduced to 0.67% of the processing time required to process the original rendering block with the rendering unit 302. Namely, the rendering units 302 may multiply the size of the rendering block by a ratio of capabilities thereby to determine the sizes of the divided rendering blocks.

Further, the rendering block may be divided such that the divided rendering blocks predominantly contain rendering commands that can be processed at high speed. In such a case, the rendering-block dividing unit 303 may divide the rendering block into quarters, and calculates the processing time lengths of the rendering processing units 1 and 2 by taking into account their capabilities for each quarter. Allocation of the quarters of the rendering block to the rendering processing unit 1 or 2 is then determined such that the total processing time becomes the shortest.

It may be noted that when division is made by taking into account the contents of rendering commands, it is preferable to exclude the already processed rendering commands from such calculation.

<Case of Three Rendering Processing Units>

FIG. 15A is a drawing illustrating an example of a rendering block when there are three rendering processing units. The rendering block A is allocated to the rendering processing unit 1, the rendering block B allocated to the rendering processing unit 2, and the rendering block C allocated to the rendering processing unit 3. When the three rendering processing units 1 through 3 performs rendering of three respective rendering blocks, one of the rendering processing units 1 through 3 completes rendering first. Since the procedure performed upon such completion is the same for any one of the rendering processing units 1 through 3, an example in which the rendering processing unit 1 completes rendering in the rendering block A first is used in FIG. 15A.

For the rendering processing unit 1, there are two other rendering processing units that are performing rendering. That is, when there are three or more rendering processing units in total, there are two or more rendering blocks being processed at the time the rendering processing unit 1 completes its rendering. In such a situation, the rendering processing unit 1 needs to use some criteria to select one of the rendering blocks B and D that is to be divided.

Figure 16:
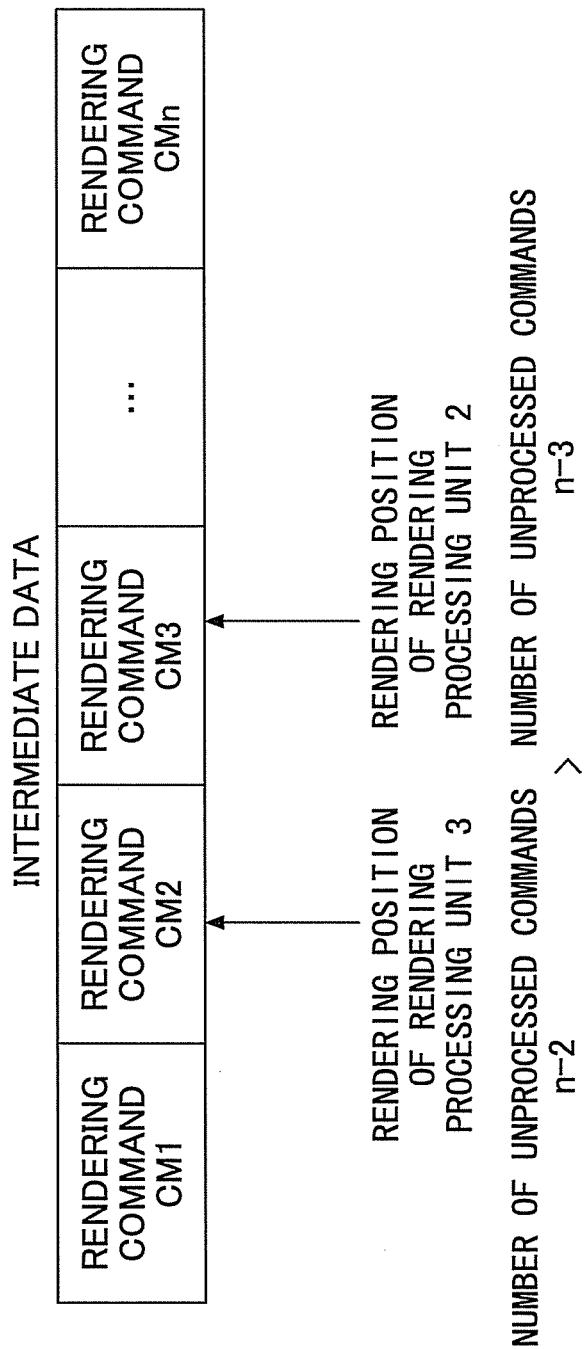
FIG. 16 is a drawing illustrating an example of criteria used by the rendering processing unit to select one of rendering blocks B and D that is to be divided.

FIG. 16 is a drawing illustrating an example of the criteria used by the rendering processing unit 1 to select one of the rendering blocks B and D that is to be divided. FIG. 16 illustrates the progress of rendering commands processed by the rendering processing units 1 through 3. For the rendering processing unit 1, there is no rendering position since the rendering process has come to an end. The rendering processing unit 2 is processing the rendering command CM3, and the rendering processing unit 3 is processing the rendering command CM2.

Since the rendering processing unit 3 has a larger number of rendering commands left to be processed, it is predicted that the remaining processing time will be longer for the rendering processing unit 3 than for the rendering processing unit 2. The rendering processing unit 1 uses inter-core communication to inquire of the rendering processing units 2 and 3 the positions of rendering commands that are being processed. The rendering processing unit 1 then selects one of the rendering processing units 2 and 3 that has a larger number (or the largest number) of rendering commands left to be processed, and this selected one serves as the rendering processing unit 16 to which an inquiry is made to check whether division is necessary. The rendering processing unit 1 then inquires of the selected one of the rendering processing units 2 and whether it is necessary to divide the rendering block.

Alternatively, the rendering processing unit 1 may randomly select one of the rendering processing units 2 and 3. In the example illustrated in FIG. 16, the number of unprocessed rendering commands left to be processed is used to select the rendering processing unit to which a division inquiry is made. Alternatively, the lengths of processing time of remaining rendering commands may be estimated based on the capabilities, followed by comparing the processing time lengths to select one of the rendering processing units 2 and 3 of which a necessity of division will be inquired. Alternatively, one of the rendering processing units 2 and 3 to which a rendering block is allocated to achieve a shorter processing time at the time of processing may be selected.

In the manner as described above, the rendering processing unit 1 inquires of the rendering processing unit 3 whether division is necessary, so that the rendering-block dividing unit 303 of the rendering processing unit 3 divides the rendering block. It may be noted that, if the rendering processing unit 2 has a larger number of unprocessed rendering commands than the rendering processing unit 3, the rendering block B of the rendering processing unit 2 is divided.

Figure 15B:
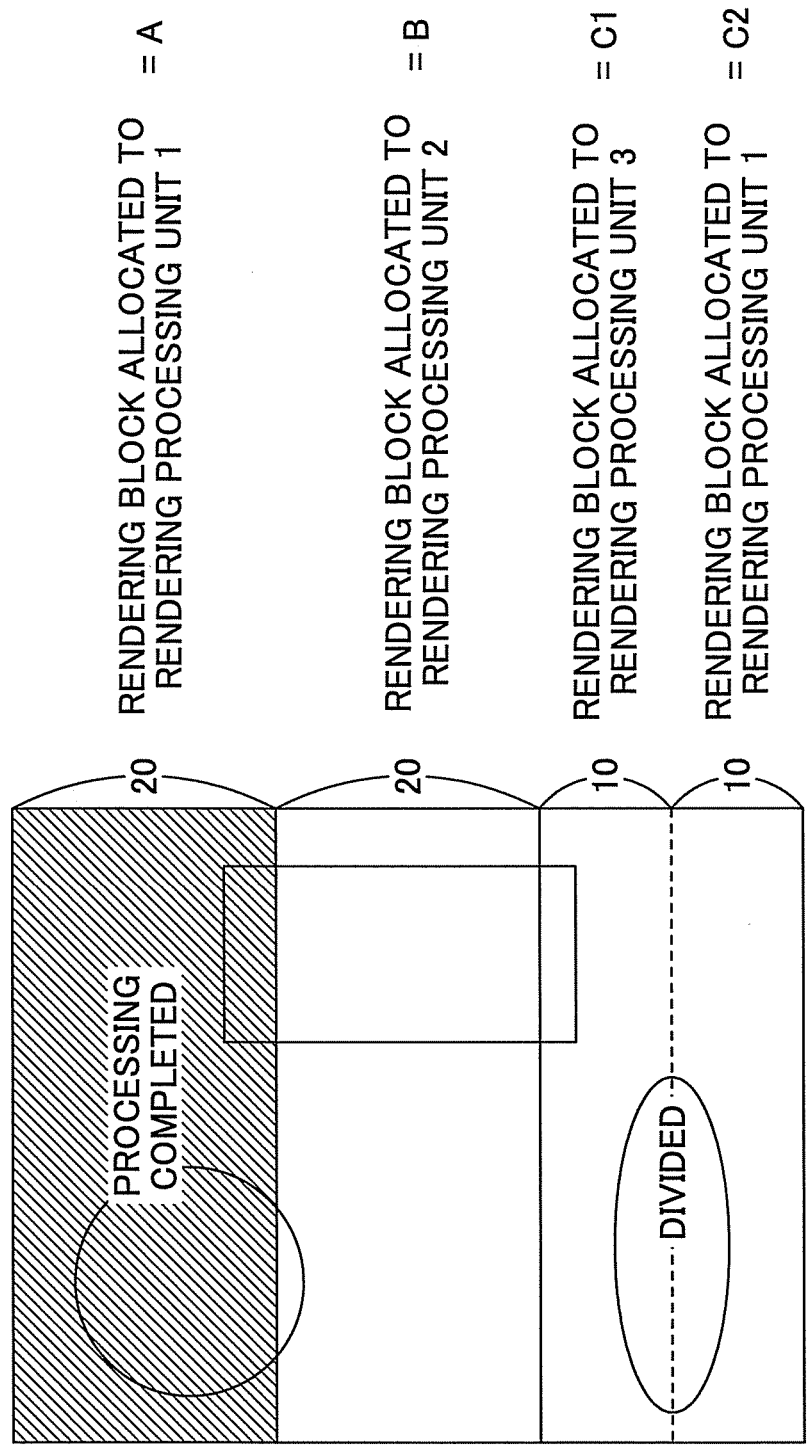

FIG. 15B is a drawing schematically illustrating an example of dividing the rendering block C into equal halves. The rendering unit 302 of the rendering processing unit 3 determines that division is necessary. In response, the rendering-block dividing unit 303 divides the rendering block C into rendering blocks C1 and C2 having the same size. In place of division at equal intervals as illustrated in FIG. 158, division may be made at varying intervals depending on the capabilities of the rendering processing units 1 and 3 as described in connection with FIG. 14B.

<Case of Three Rendering Processing Units and Four Rendering Blocks>

FIG. 17A is a drawing illustrating an example of division in the case of four rendering blocks when there are three rendering processing units. The rendering block A is allocated to the rendering processing unit 1, the rendering block B allocated to the rendering processing unit 2, the rendering block C allocated to the rendering processing unit 3, and the rendering block D allocated to the rendering processing unit 1. When the three rendering processing units 1 through 3 perform rendering of four rendering blocks, it is estimated that the processing time of the rendering processing unit 1 processing the broadest total of rendering blocks will be the longest.

In the following, a description will be given of a situation in which the rendering processing unit 3 completes performing rendering of the rendering block C while the rendering processing unit 1 is performing rendering of the rendering block D after completing rendering of the rendering block A situated at the top.

In such a case, the rendering processing units 1 and 2 have ongoing rendering processes when viewed from the rendering processing unit 3. The rendering processing unit 3 selects one of the rendering processing units 1 and 2 according to the criteria described in connection with FIG. 16, followed by inquiring of the selected one whether division is necessary. In this example, an inquiry about the necessity of division will be made of the rendering processing unit 2 that has a rendering block of a larger area size allocated thereto.

FIG. 17B is a drawing schematically illustrating an example of dividing the rendering block B into equal halves. The rendering unit 302 of the rendering processing unit 2 determines that division is necessary. In response, the rendering-block dividing unit 303 divides the rendering block B into rendering blocks B1 and B2 having the same size.

In the manner as described above, even when rendering blocks having different sizes are allocated to the rendering processing units, any given one of the rendering processing units 1 through 3 can divide its rendering block such that the processing time of rendering of one page is shortened.

<Case where Rendering Processing Units Complete Rendering Almost Simultaneously>

FIG. 18A is a drawing schematically illustrating a situation in which the rendering processing units 1 and 3 complete rendering almost simultaneously, and only the rendering processing unit 2 is performing rendering. The rendering processing units 1 and 3 may complete rendering of the allocated rendering blocks, respectively. In such a case, all of the rendering processing units 1 through 3 may together perform rendering of the remaining rendering block thereby to shorten the rendering processing time. Both of the rendering processing units 1 and 3 inquire of the rendering processing unit 2 whether division is necessary. With this arrangement, the rendering processing unit 2 detects that the rendering block B needs to be divided into three.

FIG. 18B is a drawing schematically illustrating an example of dividing the rendering block B into three equal parts.

The rendering unit 302 of the rendering processing unit 2 determines that division is necessary in response to the inquiries sent from the rendering processing units 1 and 2. In response, the rendering-block dividing unit 303 of the rendering processing unit 2 divides the rendering block B into three parts. After this, the rendering processing units 1, 2, and 3 resume performing rendering of the rendering blocks B1, B2, and B3.

It may be noted that the capabilities of the rendering processing units 1 through 3 are known to the rendering processing units 1 through 3. Accordingly, rendering blocks may be allocated such that the processing time lengths become substantially equal to each other. In this manner, uniform division may be achieved.

As described above, the image forming apparatus of the present embodiment dynamically allocates rendering blocks to a plurality of rendering units. Further, there is no need for a special mechanism for monitoring the rendering units.

Further, the present invention is not limited to these embodiments, but various variations and modifications may be made without departing from the scope of the present invention.

The present application is based on Japanese priority application No. 2010-228837 filed on Oct. 8, 2010, with the Japanese Patent Office, the entire contents of which are hereby incorporated by reference.

What is claimed is:

1. An image forming apparatus for printing an image of print data on a transfer medium, comprising:
 a rendering command generating unit to analyze the print data to generate rendering command data, which includes rendering commands regarding rendering objects for each page;
 a rendering command data storing unit to store the rendering command data; and
 a plurality of rendering processing units to read the rendering command data from the rendering command data storing unit and to execute the rendering commands associated with respective rendering blocks to perform rendering,
 wherein, upon completing rendering with respect to a first rendering block, a first one of the rendering processing units sends a notice of completion to a second one of the rendering processing units that is performing rendering with respect to a second rendering block, and wherein, in response to the notice, the second one of the rendering processing units divides the second rendering block, and requests the first one of the rendering processing units to perform rendering of part of the second rendering block.

2. The image forming apparatus as claimed in claim 1, wherein the second one of the rendering processing units determines based on predetermined criteria whether the second rendering block needs to be divided.

3. The image forming apparatus as claimed in claim 2, wherein the second one of the rendering processing units determines whether the second rendering block needs to be divided, based on whether the number of unprocessed rendering commands belonging to the second rendering block is larger than a predetermined number.

4. The image forming apparatus as claimed in claim 3, wherein the second one of the rendering processing units obtains a first processing time by weighting the unprocessed rendering commands with a capability of the first one of the rendering processing units, and obtains a second processing time by weighting the unprocessed rendering commands with a capability of the second one of the rendering processing units, followed by comparing the first processing time and the second processing time to determine whether the second rendering block needs to be divided.

5. The image forming apparatus as claimed in claim 2, wherein the second one of the rendering processing units determines whether the second rendering block needs to be divided, based on whether an area size of the second rendering block is larger than a predetermined threshold.

6. The image forming apparatus as claimed in claim 2, wherein the second one of the rendering processing units divides the second rendering block into areas having equal area size.

7. The image forming apparatus as claimed in claim 6, wherein the second one of the rendering processing units obtains a first processing time by weighting the unprocessed rendering commands with a capability of the first one of the rendering processing units, and obtains a second processing time by weighting the unprocessed rendering commands with a capability of the second one of the rendering processing units, followed by dividing the second rendering block into a first part and a second part based on the first processing time and the second processing time, such that a processing time required for the first one of the rendering processing units to process the first part and a processing time required for the second one of the rendering processing units to process the second part are substantially equal to each other.

8. The image forming apparatus as claimed in claim 1, wherein the second one of the rendering processing units divides the second rendering block into three parts in an event that, upon receiving the notice from the first one of the rendering processing units, and prior to dividing the second rendering block, the second one of the rendering processing units receives a notice of completion from a third one of the rendering processing units having completed rendering of a third rendering block.

9. A method for processing an image in an image forming apparatus for printing an image of print data on a transfer medium, comprising:
 analyzing, with a rendering command generating unit, the print data to generate rendering command data, which includes rendering commands regarding rendering objects for each page;
 storing, in a rendering command data storing unit, the rendering command data;
 reading, with a plurality of rendering processing units, the rendering command data from the rendering command data storing unit to execute the rendering commands associated with respective rendering blocks to perform rendering;
 sending, from a first one of the rendering processing units upon completing rendering of a first rendering block, a notice of completion to a second one of the rendering processing units that is performing rendering with respect to a second rendering block; and
 dividing, with the second one of the rendering processing units responding to the notice, the second rendering block to request the first one of the rendering processing units to perform rendering of part of the second rendering block.

10. A non-transitory recording medium having a program embodied therein for causing an image forming apparatus for printing an image of print data on a transfer medium to perform:
 a rendering command generating step of analyzing the print data to generate rendering command data, which includes rendering commands regarding rendering objects for each page;
 storing, in a rendering command data storing unit, the rendering command data;
 reading, with a plurality of rendering processing units, the rendering command data from the rendering command data storing unit to execute the rendering commands associated with respective rendering blocks to perform rendering; and
 a control step of performing control such that, upon completing rendering with respect to a first rendering block, a first one of the rendering processing units sends a notice of completion to a second one of the rendering processing units that is performing rendering with respect to a second rendering block, and such that, in response to the notice, the second one of the rendering processing units divides the second rendering block, and requests the first one of the rendering processing units to perform rendering of part of the second rendering block.

* * * * *